US008271438B2

(12) United States Patent
Takahashi et al.

(10) Patent No.: US 8,271,438 B2
(45) Date of Patent: Sep. 18, 2012

(54) ASYNCHRONOUS REMOTE COPY SYSTEM AND STORAGE CONTROL METHOD

(75) Inventors: Masamitsu Takahashi, Chigasaki (JP); Katsuhiro Okumoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 108 days.

(21) Appl. No.: 12/865,767

(22) PCT Filed: Apr. 7, 2010

(86) PCT No.: PCT/JP2010/002541
§ 371 (c)(1),
(2), (4) Date: Aug. 2, 2010

(87) PCT Pub. No.: WO2011/125127
PCT Pub. Date: Oct. 13, 2011

(65) Prior Publication Data
US 2011/0251999 A1 Oct. 13, 2011

(51) Int. Cl.
G06F 17/30 (2006.01)
(52) U.S. Cl. ........................................ 707/613
(58) Field of Classification Search .......... 707/610–615
See application file for complete search history.

(56) References Cited

U.S. PATENT DOCUMENTS

| 2003/0014432 | A1* | 1/2003 | Teloh et al. ............... 707/204 |
| 2005/0050115 | A1* | 3/2005 | Kekre ........................ 707/204 |
| 2005/0210078 | A1 | 9/2005 | Maruyama et al. |
| 2006/0047664 | A1 | 3/2006 | Suzuki et al. |
| 2006/0123212 | A1* | 6/2006 | Yagawa ..................... 711/162 |
| 2007/0050574 | A1* | 3/2007 | Kaiya et al. ................ 711/162 |
| 2008/0201527 | A1 | 8/2008 | Suzuki et al. |
| 2008/0243946 | A1* | 10/2008 | Deguchi et al. ............ 707/202 |

FOREIGN PATENT DOCUMENTS

| JP | 2005-267216 A | 9/2005 |
| JP | 2006-65624 A | 3/2006 |
| JP | 2006-65629 A | 3/2006 |

* cited by examiner

Primary Examiner — Khanh Pham
(74) Attorney, Agent, or Firm — Mattingly & Malur, PC

(57) ABSTRACT

Before starting asynchronous remote copy in the multihop method (asynchronous remote copy from the first to the second storage apparatus to the third storage apparatus), a first and a second initial copy are performed. The first initial copy is a copy for making the contents of the first data volume in the first storage apparatus and the contents of the second data volume in the second storage apparatus consistent and the second initial copy is a copy for making the contents of the second data volume and the contents of the third data volume in the third storage apparatus consistent. In the second initial copy, the second storage apparatus creates a journal including the update number and the data in the second data volume, and the journal is transferred from the second storage apparatus to the third storage apparatus. The created update number is acquired from the first storage apparatus.

5 Claims, 24 Drawing Sheets

FIG. 10

| SEQ# | Write destination information | PVOL# | SVOL# | ... |
|---|---|---|---|---|
| | | | | |

701A

| JNL group # | JVOL valid bitmap | | | | | |
|---|---|---|---|---|---|---|
| | 0 | 1 | 2 | 3 | ... | 63 |
| 0 | 1 | 0 | 0 | 0 | | 0 |
| 1 | 1 | 1 | 1 | 0 | | 0 |
| 2 | 0 | 0 | 0 | 0 | | 0 |
| 3 | 0 | 0 | 0 | 0 | | 0 |
| ... | | | | | | |
| 255 | 0 | 0 | 0 | 0 | | 0 |

| JNL group # | DVOL valid bitmap | | | | ... | |
| --- | --- | --- | --- | --- | --- | --- |
| | 0 | 1 | 2 | 3 | | 63 |
| 0 | 0 | 0 | 0 | 1 | | 0 |
| 1 | 0 | 0 | 0 | 1 | | 0 |
| 2 | 0 | 0 | 0 | 0 | | 0 |
| 3 | 0 | 0 | 0 | 0 | | 0 |
| ... | | | | | | |
| 255 | 0 | 0 | 0 | 0 | | 0 |

FIG. 14

JVOL management table

703A

| JVOL# | Meta area beginning address | Meta area size | Data area beginning address | Data area size |
|---|---|---|---|---|
| 1 | 0x0000 | 2GB | 0x0020 | 98GB |
| 2 | 0x0000 | 2GB | 0x0020 | 98GB |
| 3 | 0x0000 | 2GB | 0x0020 | 98GB |
| .. | .. | .. | .. | .. |

FIG. 15

JNL group management table 704A

| 1001A JNL group # | 1002A Status | 1003A Mirror # | 1004A Corresponding JNL group # | 1005A Corresponding storage # | 1006A Purged SEQ# | 1007A Purgeable SEQ# | 1008A Read SEQ# |
|---|---|---|---|---|---|---|---|
| 1 | Master | 0 | 2 | 2 | 15 | 21 | NULL |
|  |  | 1 | 3 | 3 | NULL | NULL | NULL |
|  |  | 2 | NULL | NULL | NULL | NULL | NULL |
|  |  | 3 | NULL | NULL | NULL | NULL | NULL |
| 2 | Master/ Restore | 0 | 1 | 1 | 15 | 21 | NULL |
|  |  | 1 | NULL | NULL | NULL | NULL | NULL |
|  |  | 2 | 3 | 3 | NULL | NULL | NULL |
|  |  | 3 | NULL | NULL | NULL | NULL | NULL |
| 3 | Restore | 0 | 1 | 1 | 15 | 21 | NULL |
|  |  | 1 | 2 | 2 | NULL | NULL | NULL |
|  |  | 2 | NULL | NULL | NULL | NULL | NULL |
|  |  | 3 | NULL | NULL | NULL | NULL | NULL |
| .. | .. | .. | .. | .. | .. | .. | .. |
| 256 | Not set | 0 | NULL | NULL | NULL | NULL | NULL |
|  |  | 1 | NULL | NULL | NULL | NULL | NULL |
|  |  | 2 | NULL | NULL | NULL | NULL | NULL |
|  |  | 3 | NULL | NULL | NULL | NULL | NULL |

FIG. 16

Pair management table 705A

| DVOL# 1101A | JNL group # 1102A | Copy destination VOL# 1103A | Status 1104A | ... |
|---|---|---|---|---|
| 113A | 1 | 113B | PAIR | ... |
| 113B | 2 | 113C | PAIR | ... |
| 113C | 3 | NULL | NULL | ... |
| .. | . | . | . | .. |

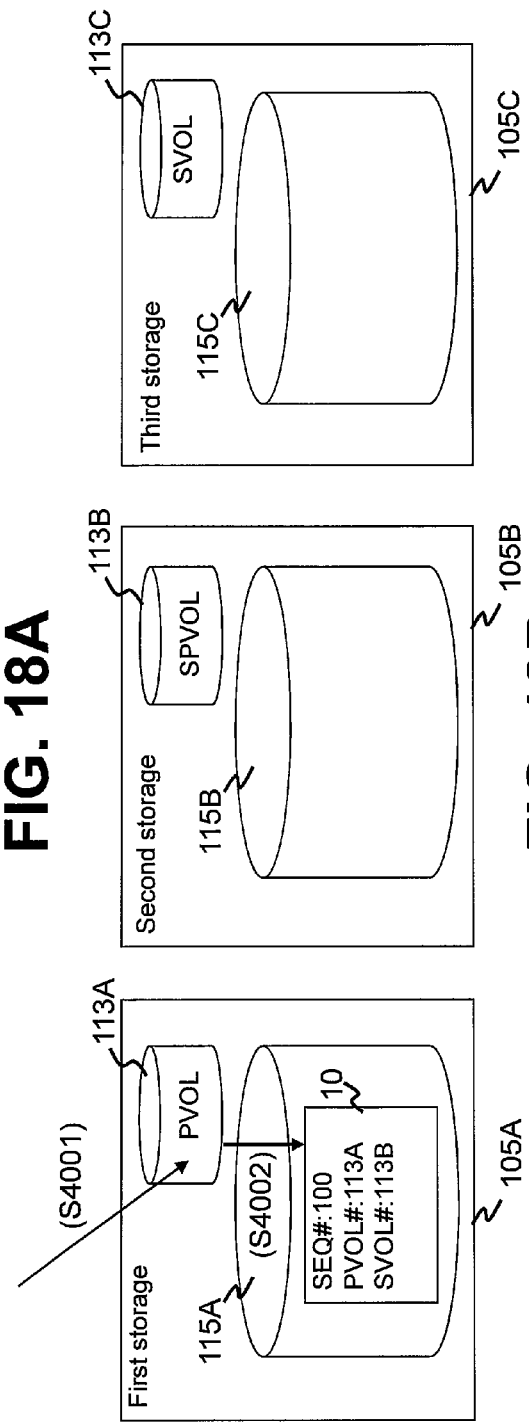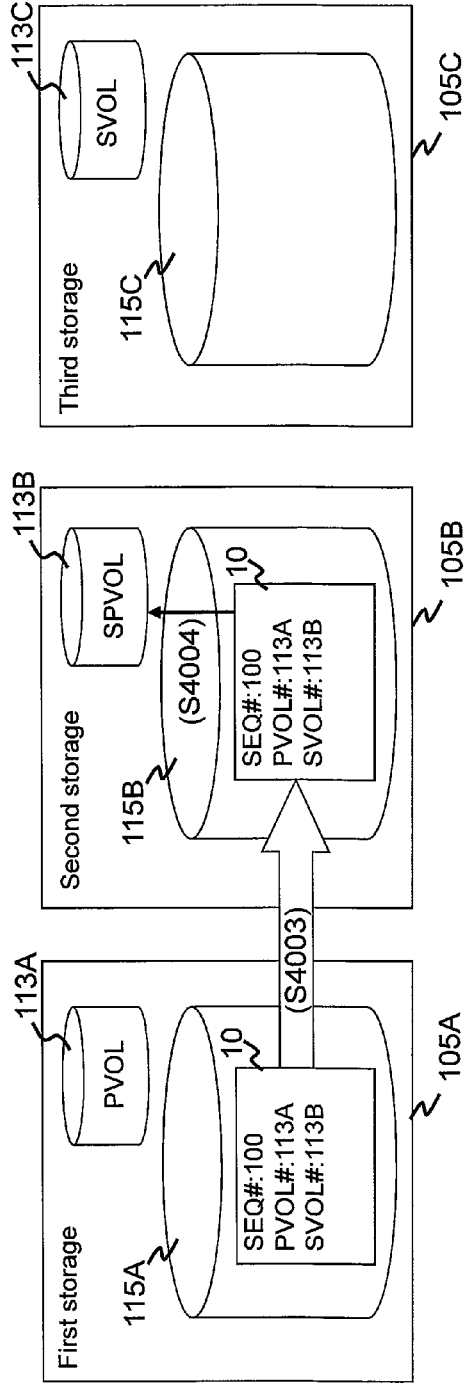

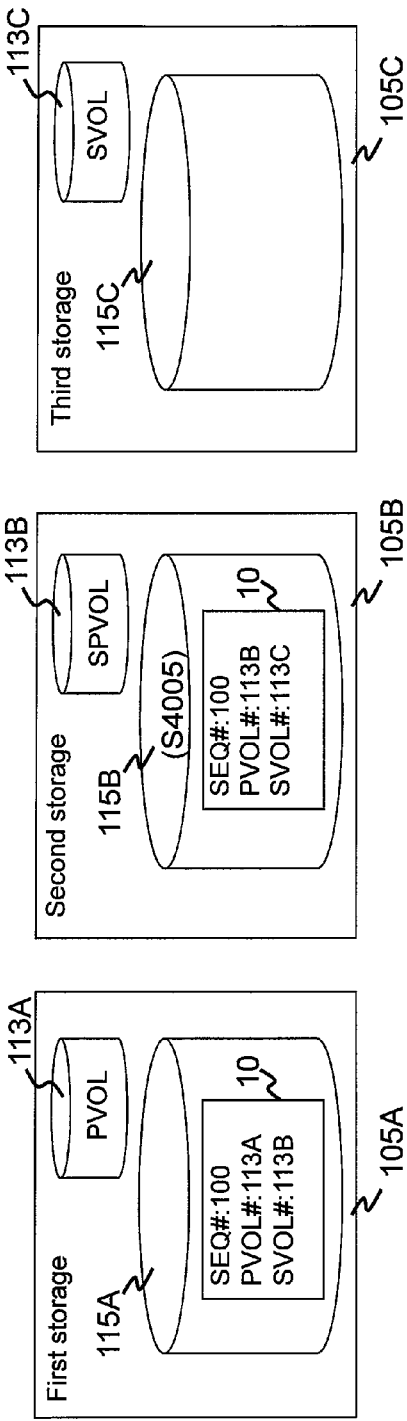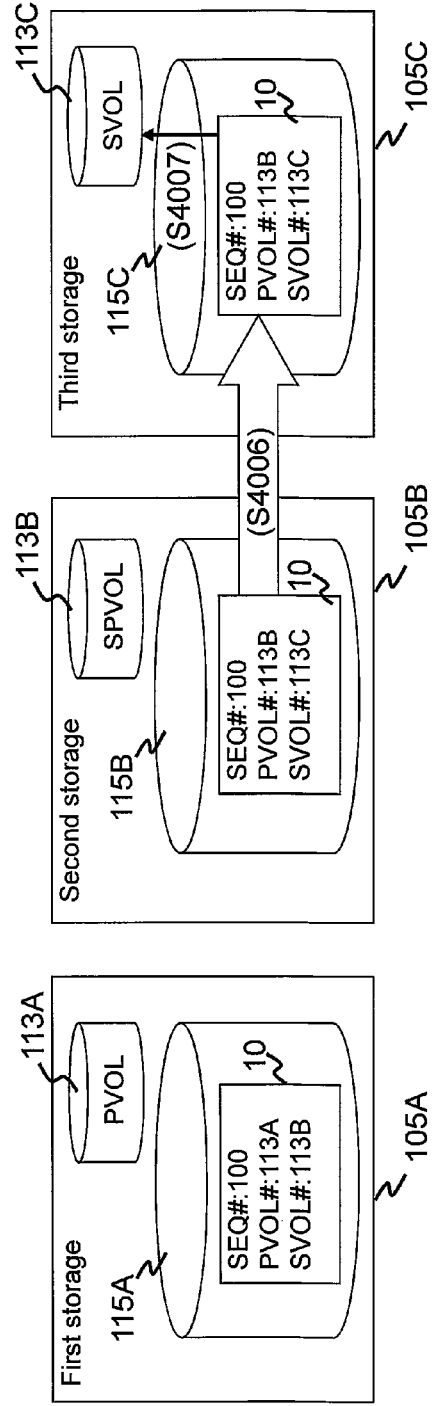

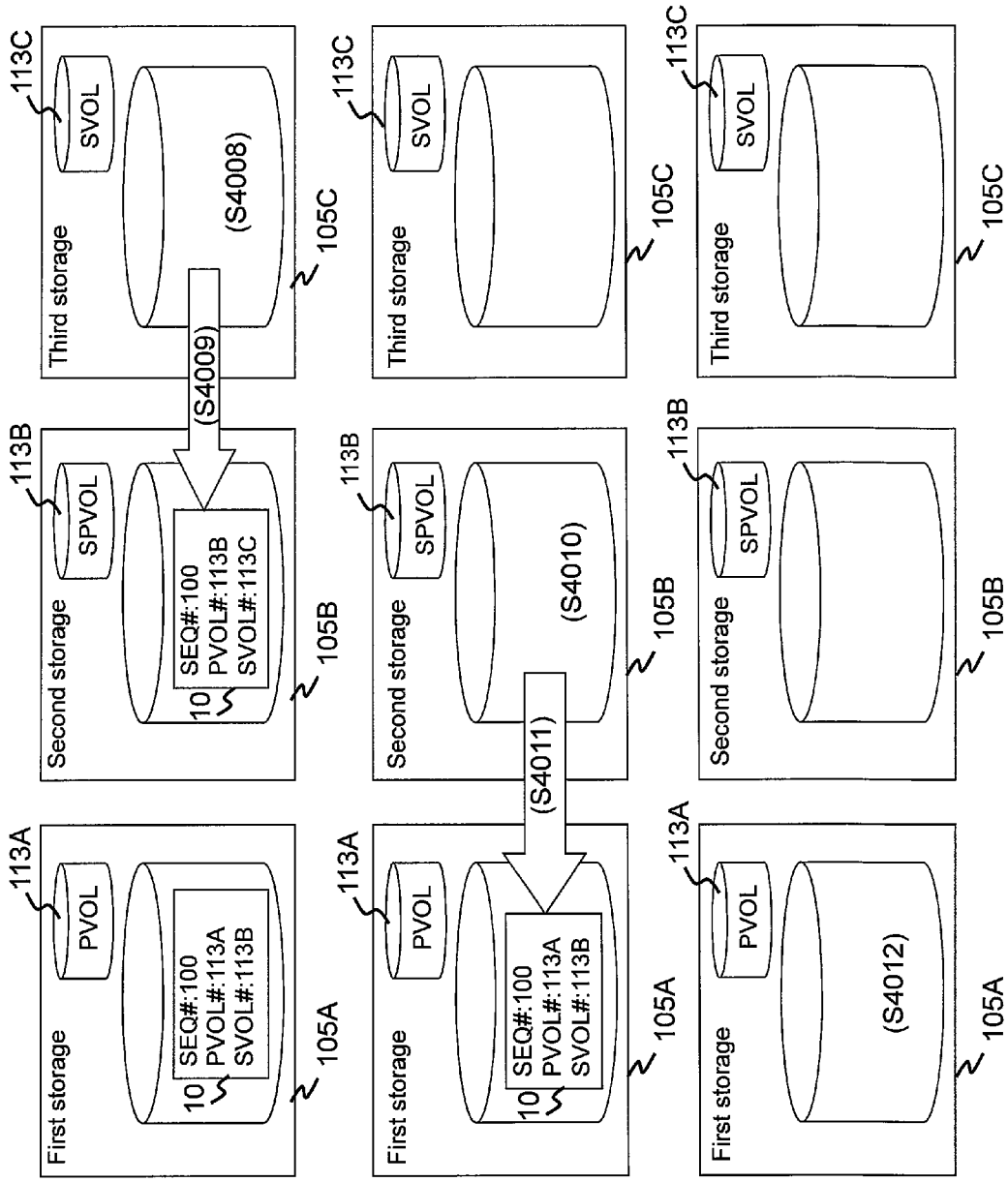

ASYNCHRONOUS REMOTE COPY SYSTEM AND STORAGE CONTROL METHOD

TECHNICAL FIELD

This invention relates to storage control in a storage system performing remote copy which is data copy among storage apparatuses.

BACKGROUND ART

Remote copy which is data copy between first and second storage apparatuses is known. Types of remote copy are, for example, synchronous remote copy and asynchronous remote copy. If the first storage apparatus receives a write request from a host and if synchronous remote copy is adopted, after the data complying with the write request is transferred from the first storage apparatus to the second storage apparatus, a write completion response is transmitted to the host apparatus while, if asynchronous remote copy is adopted, even if the data complying with the write request is not transferred from the first storage apparatus to the second storage apparatus, the write completion response is transmitted to the host apparatus.

In a remote copy system to which asynchronous remote copy is adopted (hereinafter referred to as an asynchronous remote copy system), for example, the first storage apparatus comprises, as well as a first DVOL (a data volume which is a logical volume in which the data is stored), a first JVOL (a journal volume which is a logical volume in which a journal (hereinafter referred to as a JNL) is stored). Similarly, the second storage apparatus comprises a second JVOL as well as a second DVOL. The first storage apparatus, if receiving a write request, stores the data complying with the write request in the first DVOL and, at the same time, stores the JNL of the data in the first JVOL. The first storage apparatus transfers the JNL in the first JVOL to the second storage apparatus, and the second storage apparatus writes the JNL from the first storage apparatus to the second JVOL. After that, the second storage apparatus writes the data which the JNL in the second JVOL comprises to the second DVOL. By this method, the data written to the first DVOL is considered to have been copied to the second DVOL.

In Patent Literature 1, an asynchronous remote copy system with a multihop (cascade) method is disclosed. In the multihop method, three or more storage apparatuses are serially connected, of which the storage apparatus as the starting point is the copy source while the storage apparatus as the ending point is the copy destination, and the intermediate storage apparatuses existing between the starting point and the ending point are both the copy source and the copy destination.

As more specifically described, in the Patent Literature 1, for example, the items below are disclosed.
(*) The first storage apparatus, the second storage apparatus, and the third storage apparatus exist.
(*) The first storage apparatus is the copy source, the third storage apparatus is the copy destination, and the second storage apparatus exists between the first and the third storage apparatuses, and is both the copy source and the copy destination.
(*) The first storage apparatus comprises a first DVOL and a first JVOL.
(*) The second storage apparatus comprises a second DVOL, a first second JVOL, and a second second JVOL.
(*) The third storage apparatus comprises a third DVOL and a third JVOL.
(*) The first and the second DVOLs are paired. The first DVOL is the primary DVOL (PVOL), and the second DVOL is the secondary DVOL (SVOL).
(*) The second and the third DVOLs are paired. The second DVOL is the primary DVOL (PVOL), and the third DVOL is the secondary DVOL (SVOL). That is, the second DVOL is an SPVOL which is both the PVOL and SVOL.
(*) A first host apparatus writes the data to the first DVOL.
(*) The first host apparatus updates an update number.
(*) The first storage apparatus writes the JNL of the data written to the first DVOL to the first JVOL. The JNL, as well as the data which is the input/output target of the host apparatus, includes the update number.
(*) The JNL in the first JVOL is copied to the first second JVOL.
(*) The second storage apparatus reflects one or more JNLs in the first second JVOL which are not reflected in the second DVOL in order of the update numbers (writes the data which the JNLs comprise to the second DVOL).
(*) The second storage apparatus writes the JNL including the data in the JNLs reflected in the second DVOL to the second second JVOL.
(*) The JNL in the second second JVOL is copied to the third JVOL.
(*) The third storage apparatus reflects one or more JNLs in the third JVOL which are not reflected in the third DVOL in order of the update numbers.

CITATION LIST

Patent Literature

PTL (Patent Literature) 1: Japanese Unexamined Patent Application Publication No. 2006-65629

SUMMARY OF INVENTION

Technical Problem

According to asynchronous remote copy with a multihop method, a first pair which is the pair of the first DVOL (PVOL) and the second DVOL and a second pair which is the pair of the second DVOL and the third DVOL are serial. According to asynchronous remote copy with a multihop method, the collaboration of three or more storage apparatuses is important.

As cases where the collaboration becomes the problem, the cases where initial copy is performed can be considered. Initial copy is the copy which makes the contents of the PVOL and the contents of the SVOL consistent. Initial copy is also performed in cases where the contents (data) of the PVOL and the SVOL configuring a suspended pair are not consistent.

As more specifically described, for example, if a certain pair is suspended, as shown in FIG. 23, the copy source storage apparatus, even if writing data to the PVOL, does not create a JNL comprising the data. The copy source storage apparatus, if writing data to a certain write destination block in the PVOL, manages that the write destination block is already updated (that the data in the write destination block is different from the data in the block in the SVOL with the same address as the address of the write destination block) by using a bitmap, for example. After that, initial copy is performed. In initial copy, the copy source storage apparatus creates a JNL comprising the data stored in the updated block in the PVOL and the update number, and writes the created JNL to a JVOL in the copy destination storage apparatus. The copy destination storage apparatus reflects the JNL in the JVOL in the SVOL. By this series of processing, even if the contents of the PVOL and the contents of the SVOL are not consistent due to having been suspended, it is possible to make the same consistent.

Initial copy is performed for both the first and the second pairs. The update number in the JNL created in initial copy is assigned by the copy source storage apparatus.

At this point, it is considered that, in the asynchronous remote copy system with a multihop method, initial copy is performed both between the first and the second storage apparatuses and between the second and the third storage apparatuses.

As the first, the second, and the third storage apparatuses are serially connected and, at the same time, the copy source is the first storage apparatus, firstly, the first initial copy between the first and the second storage apparatuses is performed and, after the completion of the first initial copy, the second initial copy may preferably be performed between the second and the third storage apparatuses.

Furthermore, during the second initial copy, it is preferable that the first DVOL (PVOL) is in the write enable status in which data can be written from the first host. This is because the operation can be started earlier compared with the case where the first DVOL is in the write inhibit status (the status where data write from the first host is inhibited) during the second initial copy.

However, in that case, the problem described below occurs.

That is, as shown in FIG. 24, in the second initial copy, the second storage apparatus as the copy source updates the update number, and creates a JNL comprising the update number (e.g., "80"). Meanwhile, the first storage apparatus, if writing data to the PVOL during the second initial copy, updates the update number, and creates a JNL including the data and the update number (e.g., "40"). The JNL is transmitted from the first storage apparatus to the second storage apparatus. This causes the second storage apparatus to transmit both the JNL including the update number (e.g., "80") which is updated in the second storage apparatus and the JNL including the update number (e.g., "40") which is updated in the first storage apparatus to the third storage apparatus. Though the third storage apparatus is supposed to reflect multiple JNLs from the second storage apparatus in the SVOL in order of the update numbers, updating the update numbers in the first storage apparatus is not related to updating the update numbers in the second storage apparatus. This might cause the update numbers to become non-sequential, and therefore, the JNLs cannot be normally reflected in the SVOL.

Another type of case where the collaboration of three or more storage apparatuses becomes a problem is the case described below. That is, if the second storage apparatus is terminated due to causes such as a failure, the continuation of the operation can be intended by the JNLs in the first storage apparatus being transmitted to the third storage apparatus, but it might be possible that the JNLs which must be transmitted to the third storage apparatus are already purged from the first storage apparatus.

Therefore, the purpose of this invention is, in an asynchronous remote copy system with a multihop method, even if the first DVOL in the first storage apparatus is in the write enable status while the initial copy is performed between the second and the third storage apparatuses, to ensure that the JNL can be normally reflected in the DVOL in the third storage apparatus.

Another purpose of this invention is, in an asynchronous remote copy system with a multihop method, to inhibit the JNLs which must be transmitted to the third storage apparatus after the second storage apparatus is terminated from being purged from the first storage apparatus.

Solution to Problem

An asynchronous remote copy system which is a storage system which performs asynchronous remote copy comprises three or more serial storage apparatuses. The three or more storage apparatuses are a first storage apparatus which comprises a first storage resource group and is coupled to a host apparatus, one or more second storage apparatuses each of which comprises a second storage resource group, and a third storage apparatus which comprises a third storage resource group.

The first storage resource group comprises a first data volume which is a logical volume to which data is written and a first journal storage resource which is a storage resource to which a data journal is written.

The second storage resource group comprises a second data volume which is a logical volume to which data is written and a second journal storage resource which is a storage resource to which a data journal is written.

The third storage resource group comprises a third data volume which is a logical volume to which data is written and a third journal storage resource which is a storage resource to which a data journal is written.

The first storage apparatus is the starting point in the asynchronous remote copy with a multihop method while the third storage apparatus is the ending point in the asynchronous remote copy with a multihop method, and the one or more second storage apparatuses are the intermediate storage apparatuses existing between the first and the third storage apparatuses.

The first storage apparatus, if data is written from the host apparatus to the first data volume, updates the update number which is the number updated each time data is written to the data volume in the first storage resource group, creates a journal including the update number and the data, and writes the journal to the first journal storage resource.

The asynchronous remote copy with a multihop method is performed. In the asynchronous remote copy, by the journal being transferred from the first storage apparatus to the third storage apparatus via the one or more second storage apparatuses sequentially and, at the same time, being reflected in each transfer destination, the data in the first data volume is written to each of the second data volumes and the third data volume. As more specifically described, for example, if the number of the second storage apparatuses is assumed to be 1, in the asynchronous remote copy with a multihop method, the procedure described below is performed.

(A) The journals are copied from the first journal storage resource to the second journal storage resource.

(B) The second storage apparatus reflects one or more journals in the second journal storage resource which are not reflected in the second data volume in order of the update numbers.

(C) The journals are copied from the second journal storage resource to the third journal storage resource.

(D) The third storage apparatus reflects one or more journals in the third journal storage resource which are not reflected in the third data volume in order of the update numbers.

According to the first perspective of this invention, before starting asynchronous remote copy, the first initial copy which is the copy for making the contents of the first data volume and the contents of the second data volume consistent and the second initial copy which is the copy for making the contents of the second data volume and the contents of the third data volume consistent are performed. In the second initial copy, the second storage apparatus creates a journal including an update number and the data in the second data volume. The created journal is transferred from the second storage apparatus to the third storage apparatus. The third storage apparatus reflects the journals from the second storage apparatus in the second data volume in order of the update numbers. The update number in the journal which the second storage apparatus created in the second initial copy is the update number updated in the first storage apparatus and acquired from the first storage apparatus.

According to the second perspective of this invention, the journals including the same update numbers are sequentially purged from the journal storage resource in the storage apparatus as the ending point to the journal storage resource in the storage apparatus as the starting point. As more specifically described, for example, the third storage apparatus purges the journal reflected from the third journal storage resource from the third journal storage resource and, at the same time, notifies the update number in the purged journal to the second storage apparatuses. Each of the second storage apparatuses purges the journal including the update number notified from one of the two storage apparatuses coupled to the second storage apparatus (the third storage apparatus or the second storage apparatus on the side of the ending point) from the journal storage resource in the second storage apparatus and, at the same time, notifies the update number in the purged journal to the other one of the above-mentioned two storage apparatuses (the second storage apparatus on the side of the starting point or the first storage apparatus). The first storage apparatus purges the journal including the update number notified from the second storage apparatus from the first journal storage resource.

BRIEF DESCRIPTION OF DRAWINGS

FIG. 10 shows the configuration of a piece of meta information.

FIG. 13 shows the configuration of a DVOL valid bitmap 702A.

FIG. 14 shows the configuration of a JVOL management table 703A.

FIG. 15 shows the configuration of a JNL group management table 704A.

FIG. 16 shows the configuration of a pair management table 705A.

FIG. 18A shows data write to the PVOL 113A and JNL write to the first JVOL 115A. FIG. 18B shows the JNL transfer from the first storage 105A to the second storage 105B and the JNL reflection in the second storage 105B.

FIG. 19A shows the meta information update in the JNL in the second storage 105B. FIG. 19B shows the JNL transfer from the second storage 105B to the third storage 105C and the JNL reflection in the third storage 105C.

FIG. 20A shows the JNL purge in the third storage 105C and the notification of the SEQ# (the sequential number assigned in order of updating DVOLs in the JNL group in the first storage 105A) in the purged JNL. FIG. 20B shows the JNL purge in the second storage 105B and the notification of the SEQ# in the purged JNL. FIG. 20C shows the JNL purge in the first storage 105A.

DESCRIPTION OF EMBODIMENTS

Hereinafter, with reference to the figures, an embodiment of this invention is described.

Note that, though the description below might describe various types of information using the term of "a xxx table" and "a xxx bitmap," the various types of information may also be expressed by other data structures than tables and bitmaps. For showing the independence of the data structure, "a xxx table" and "a xxx bitmap" can be referred to as "xxx information."

Furthermore, though the description below mainly uses numbers as the identification information of various targets, other types of identification information (e.g., names) may also be adopted instead of numbers.

Figure 1:
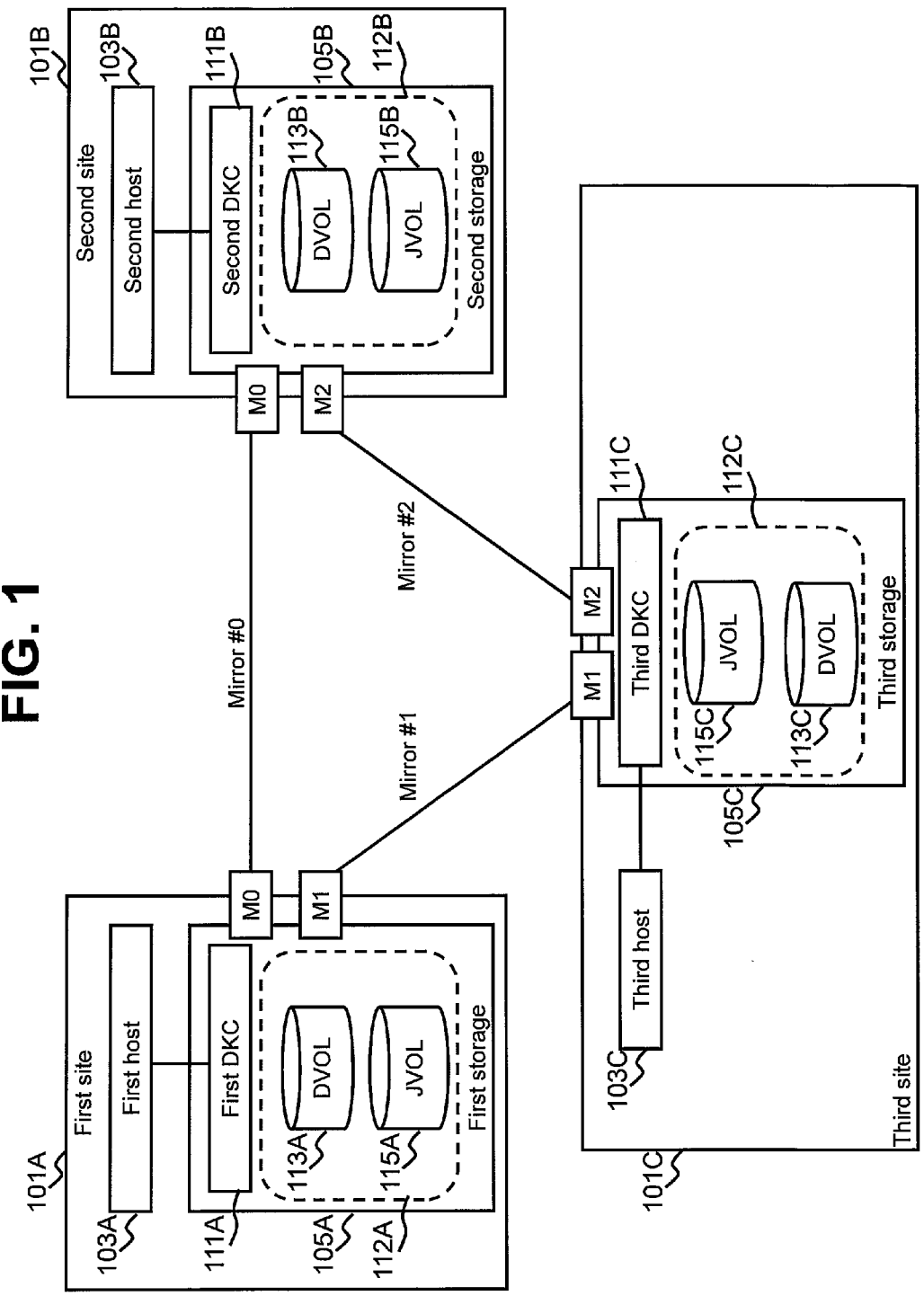
FIG. 1 shows the configuration of an asynchronous remote copy system related to an embodiment of this invention.

FIG. 1 shows the configuration of an asynchronous remote copy system related to an embodiment of this invention. Note that, in the description below, a journal is described as a "JNL," a data volume which is a logical volume to which the data is written is described as a "DVOL," a JNL volume which is a logical volume to which the JNL is written is described as a "JVOL," a host apparatus is described as a "host," a storage apparatus is described as a "storage," and a controller is described as a "DKC."

Three or more sites, for example, a first site 101A, a second site 101B, and a third site 101C exist. Hereinafter, for simplifying the description, a reference sign of an element which the first site 101A comprises is a combination of a parent number and a child sign "A," a reference sign of an element which the second site 101B comprises is a combination of a parent number and a child sign "B," and a reference sign of an element which the third site 101C comprises is a combination of a parent number and a child sign "C."

The first site 101A comprises a first storage 105A and a first host 103A coupled to the first storage 105A. The first storage 105A includes a first DKC 111A and a first JNL group 112A. JNL group 112A includes a DVOL 113A and a JVOL 115A.

The second and the third sites 101B and 101C comprise the same configuration as the first site 101A.

The storages 105A and 105B are physically coupled to each other via an exclusive path (or a communication network). The storages 105B and 105C are also physically coupled to each other via an exclusive path (or a communication network). The storages 105A and 105C are also physically coupled to each other via an exclusive path (or a communication network).

Figure 2:
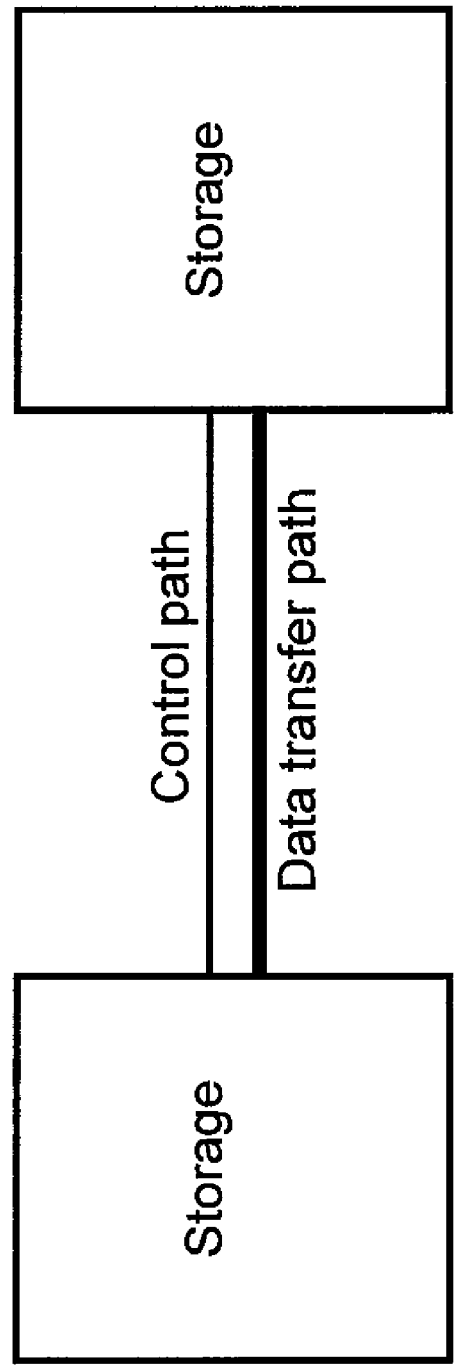
FIG. 2 shows paths between the storage apparatuses.

The paths connecting the storages are, as shown in FIG. 2, a control path and a data transfer path. The control path is a path necessary for transmission and reception of control commands between the storages. The data transfer path is a path through which the JNLs are passed. Both the control path and the data transfer path are paths capable of two-way communication.

FIG. 1 is referred to again.

Logical connections between JNL groups named "mirrors" exist. According to FIG. 1, the connection between the JNL groups 112A and 112B is a mirror #0 (a mirror to which a number "0" is assigned (M0)), the connection between the JNL groups 112A and 112C is a mirror #1 (a mirror to which a number "1" is assigned (M1)), and the connection between the JNL groups 112B and 112C is a mirror #2 (a mirror to which a number "2" is assigned (M2)).

Hereinafter, an overview of the processing related to this embodiment is described. Note that, in the description below, unless otherwise specified, there are assumed to be one JNL group 112A, one JNL group 112B, and one JNL group 112C respectively.

Figure 3:
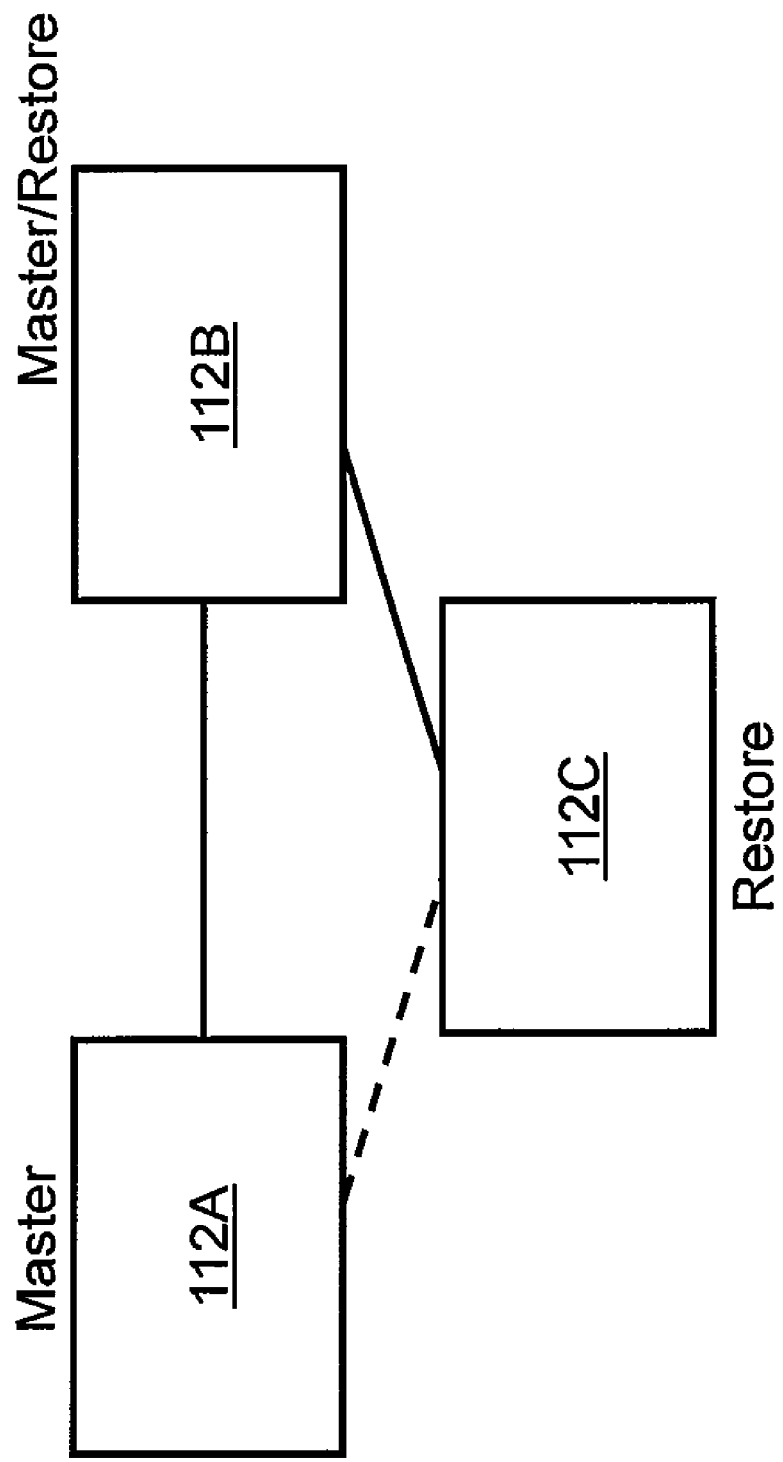
FIG. 3 shows the statuses and mirror validity/invalidity of JNL groups 112A, 112B, and 112C in FIG. 5.

In the remote copy system related to this embodiment, the asynchronous remote copy with a multihop method is supposed to be performed, and the first site 101A is the operation site. In this case, as shown in FIG. 3, the status of the first JNL group 112A is "Master," the status of the third JNL group 112C is "Restore," and the status of the second JNL group 112BC is "Master/Restore." The status "Master" indicates that the JNL group is the copy source. The status "Restore" indicates that the JNL group is the copy destination. The status "Master/Restore" indicates that the JNL group is both the copy source and copy destination. Note that, in FIG. 3 (and in the subsequent FIG. 4), the mirror shown by a dashed line is an invalid mirror while a mirror shown by a solid line is a valid mirror.

Figure 5:
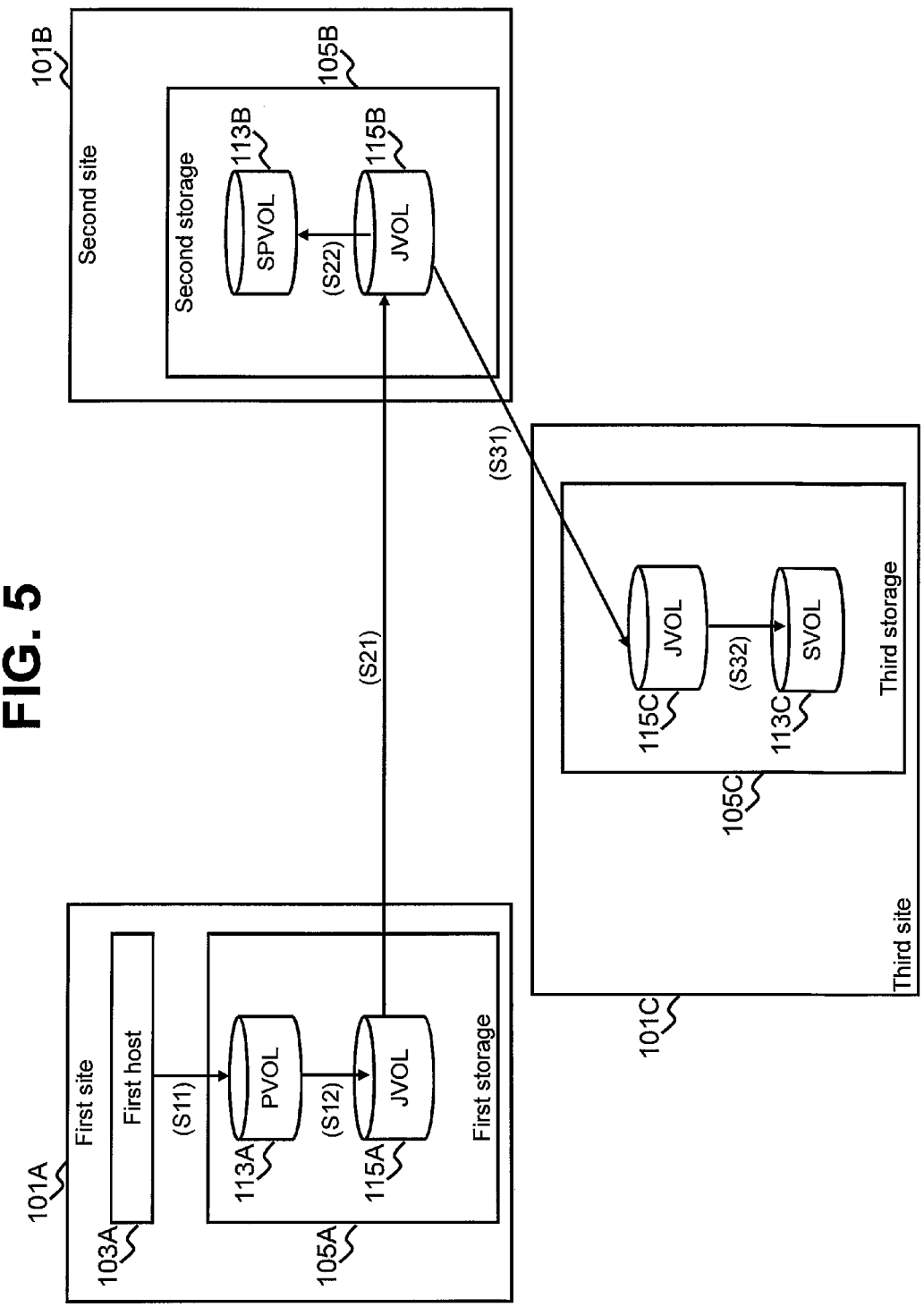
FIG. 5 shows an overview of the asynchronous remote copy with a multihop method.

Therefore, as shown in FIG. 5, the first DVOL 113A is a primary DVOL (hereinafter referred to as a PVOL), and the third DVOL 113C is a secondary DVOL (hereinafter referred to as an SVOL). The second DVOL 113B is both a primary DVOL and a secondary DVOL (hereinafter referred to as an SPVOL).

As shown in FIG. 5, in the first site 101A which is the operation site, the first host 103A, in accordance with the performed operation, writes the data to the PVOL 113A (S11). The first storage 105A updates the sequential number (hereinafter referred to as a SEQ#), creates a JNL comprising the updated SEQ# and the data written to the PVOL 113A, and writes the created JNL to the first JVOL 115A (S12). The SEQ# is the number updated each time the data is written to the first JNL group 112A (the DVOL in the first JNL group 112A) (e.g., incremented by 1 (or decremented by 1)).

The second storage 105B reads the JNL from the first JVOL 115A, and writes the read JNL to the second JVOL 115B (S21). The second storage 105B reflects the one or more JNLs in the second JVOL 115B that are not reflected in the SPVOL 113B in ascending order of the SEQ#'s (S22). As more specifically described, the second storage 105B writes the data which the JNLs in the second JVOL 115B that are not reflected comprise to the SPVOL 113B. By this method, the data written to the PVOL 113A is considered to have been copied to the SPVOL 113B.

The third storage 105C reads the JNL from the second JVOL 115B, and writes the read JNL to the third JVOL 115C (S31). The third storage 105C reflects the one or more JNLs in the third JVOL 115C that are not reflected in the SVOL 113C in ascending order of the SEQ#'s (S32). As more specifically described, the third storage 105C writes the data which the JNLs in the third JVOL 115C that are not reflected comprise to the SVOL 113C. By this method, the data written to the PVOL 113A is considered to have been copied to the SVOL 113C.

According to the asynchronous remote copy system with a multihop method, three or more storage apparatuses are serially connected. In another expression, the three or more storage apparatuses are configured of a storage apparatus as the starting point, a storage apparatus as the ending point, and one or more intermediate storage apparatuses existing between the starting point and the ending point. In this embodiment, the storage apparatus as the starting point is the first storage apparatus, the storage apparatus as the ending point is the third storage apparatus, and the intermediate storage apparatuses are the second storage apparatuses.

According to this embodiment, the JVOL included in the second JNL group 112B is common to the JVOLs in the copy source JNL group 112A and in the copy destination JNL group 112C. The JNL copy (transfer) between the storage apparatuses is realized by the copy destination storage apparatus reading JNLs from the JVOL in the copy source storage apparatus. According to this characteristic, the storage capacity consumed in the second storage 105B can be saved.

Figure 4:
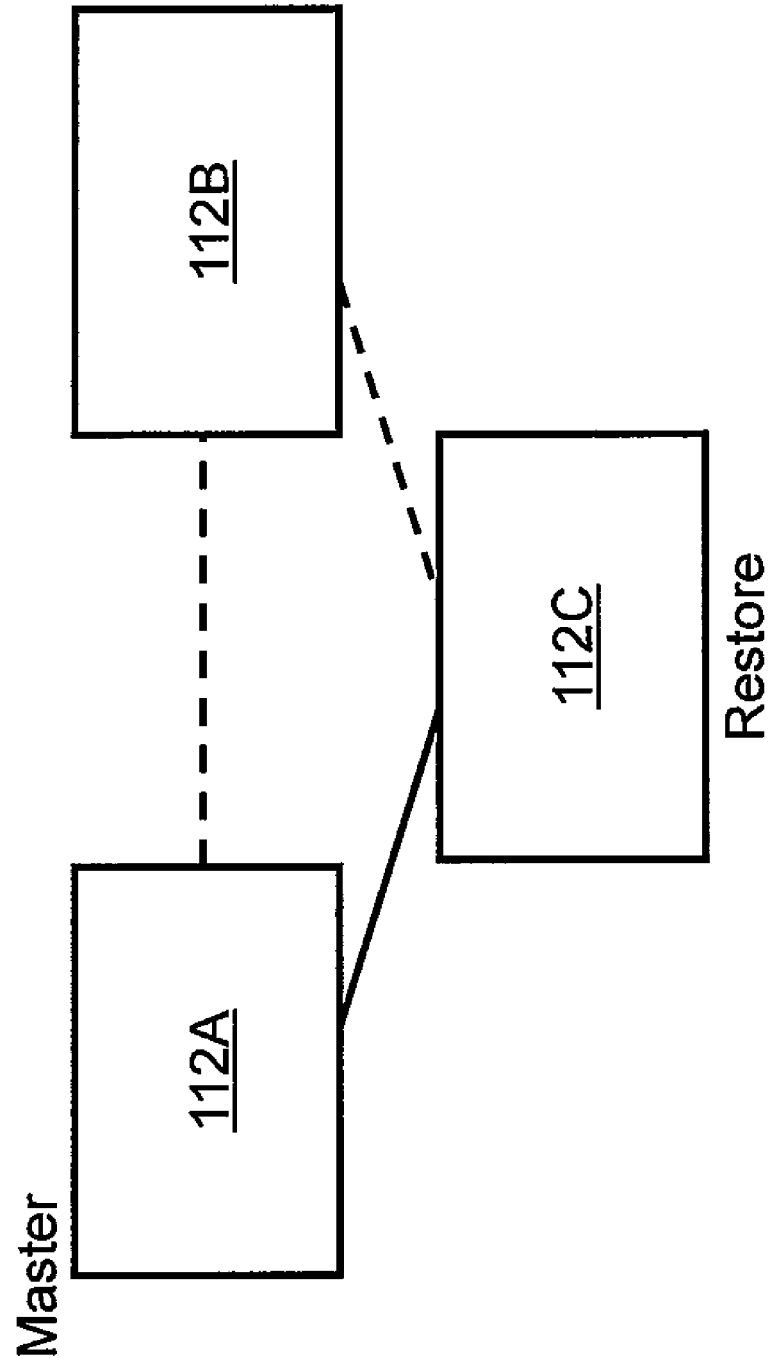
FIG. 4 shows the statuses and mirror validity/invalidity of JNL groups 112A, 112B, and 112C in FIG. 6.
Figure 6:
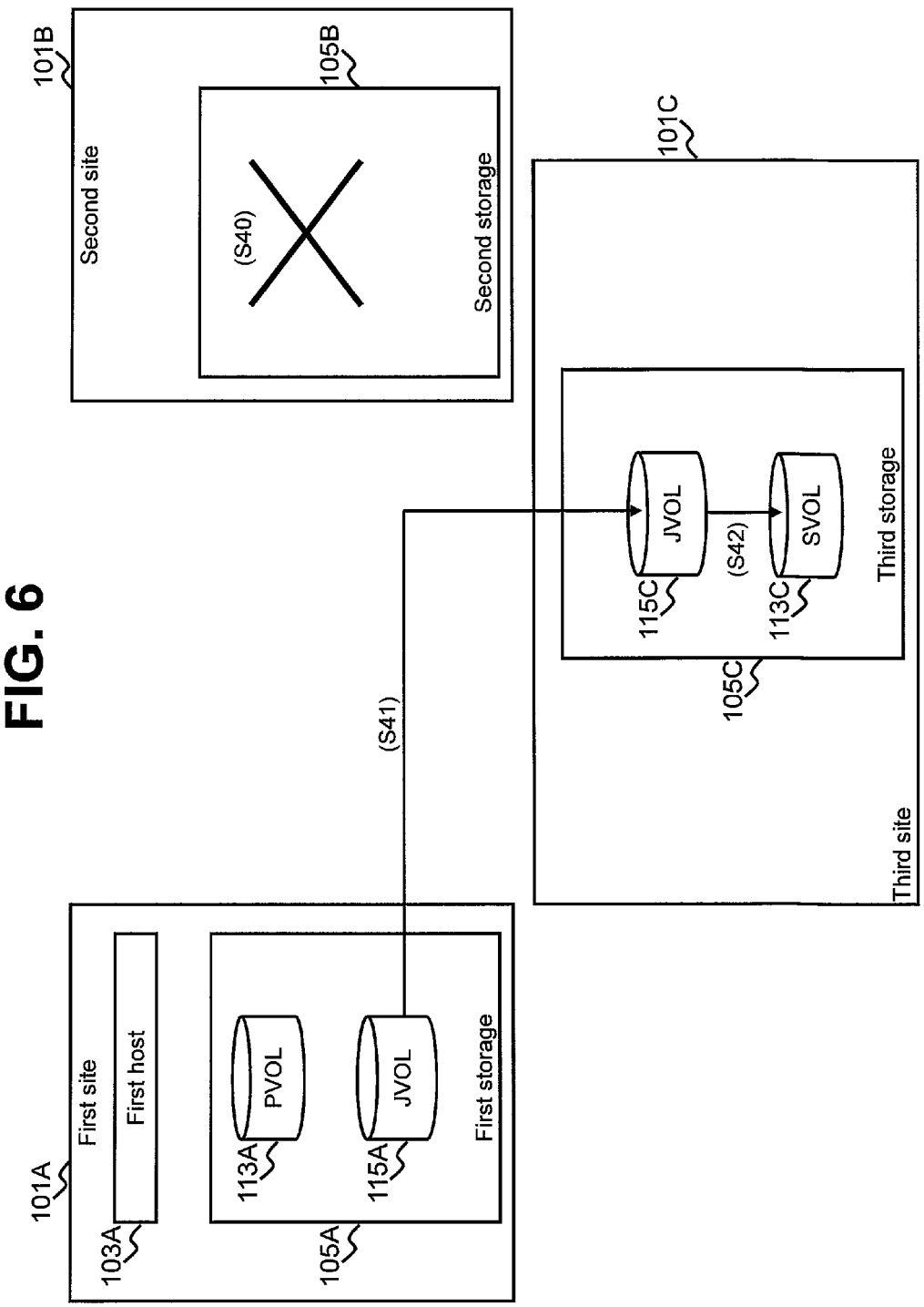
FIG. 6 shows the JNL transfer and the JNL reflection in cases where a failure occurs in the second storage 105B.

Meanwhile, as shown in FIG. 6, in the second site 101B which is the intermediate site, a failure is assumed to have occurred in the second storage 105B (S40). In this case, as shown in FIG. 4, the mirror #1 is made valid by the storage 105A and/or the storage 105C. The status of the first JNL group 112A is "Master" and the status of the third JNL group 112C is "Restore."

The third storage 105C reads the JNLs which are not read from the second JVOL 112B from the first JVOL 112A, and writes the read JNLs to the third JVOL 115C (S41). The third storage 105C reflects the one or more JNLs in the third JVOL 115C which are not reflected in the SVOL 113C in ascending order of SEQ#'s (S42). Note that, even if the second storage 105B is suspended due to a failure or other reasons, the first storage 105A may not have to set the PVOL 113A to the write inhibit status (the status in which data write from the first host 103A is inhibited). Therefore, the first storage 105A, if receiving a write request specifying a PVOL 113A from the first host 103A, writes the data complying with the write request to the PVOL 113A, updates the SEQ#, creates a JNL including the data and the updated SEQ#, and writes the created JNL to the first JVOL 115A.

According to this embodiment, the JNL which the third storage 105C does not read from the second JVOL 115B is controlled not to be purged from the first JVOL 112A. As more specifically described, the order in which the JNL is transferred between the storages is the ascending order of SEQ#'s and, at the same time, the JNLs are purged in the order of the storages 105C, 105B, and 105A. That is, the JNLs comprising the same SEQ# are, after being purged from the storages 105C and 105B, purged from the storage 105A.

Furthermore, in this embodiment, if the second storage 105B is in operation, there are some cases where the first initial copy is performed between the storages 105A and 105B, and the second initial copy is performed between the storages 105B and 105C. According to this embodiment, even if the PVOL 113A is in the write enable status (the status in which data can be written from the first host 103A) while the second initial copy is performed, the JNLs can be normally reflected in the SVOL 113C in the third storage 105C. As more specifically described, the SEQ# included in the JNL created in the second initial copy is not the SEQ# which the second storage 105B comprises (the SEQ# updated by the second storage 105B) but the SEQ# which the first storage 105A comprises (the SEQ# updated by the first storage 105A).

Hereinafter, this embodiment is described in more detail. In this case, though the description is made with reference to the elements in the first site 101A as an example typically, unless otherwise specified, the elements in the second and the third sites 101B and 101C are practically the same as the elements in the first site 101A.

Figure 7:
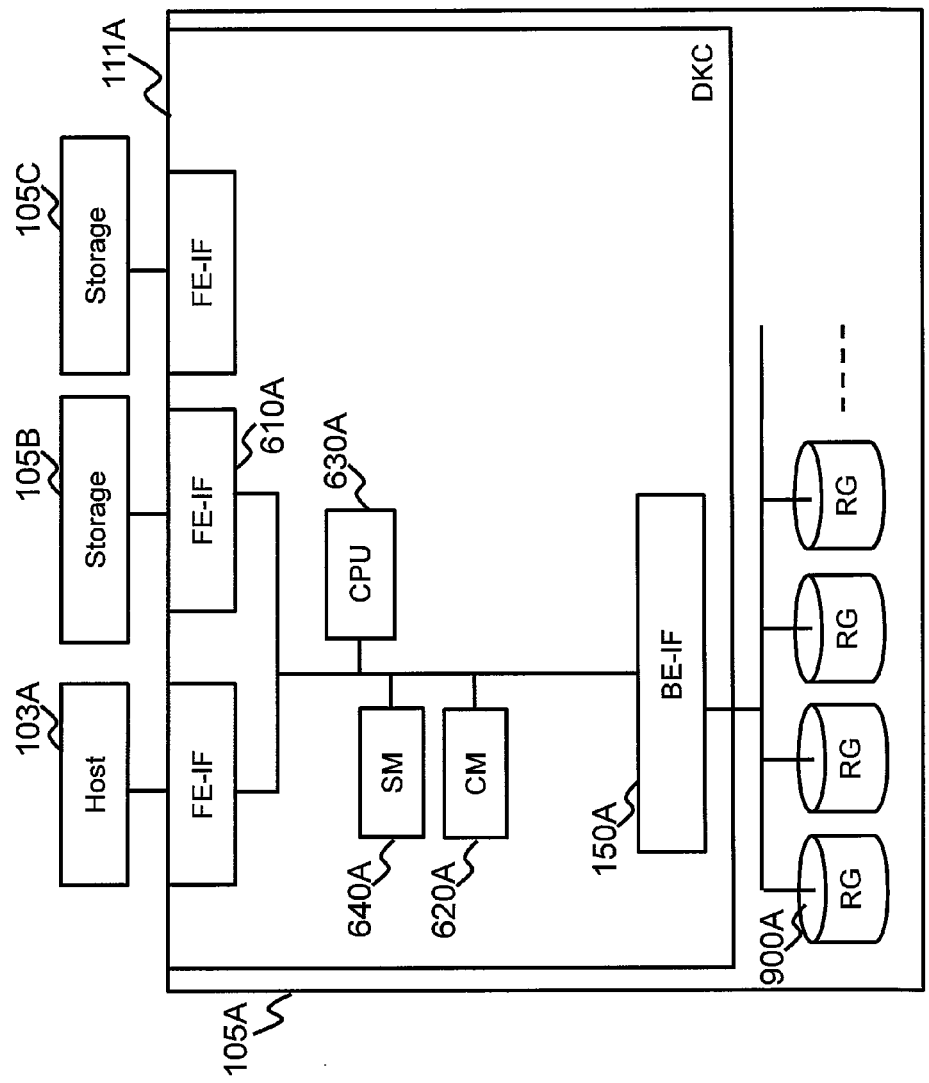
FIG. 7 shows the configuration of the first storage 105A.

FIG. 7 shows the configuration of the first storage 105A.

The first storage 105A comprises the first DKC 111A and multiple RAID (Redundant Array of Independent (or Inexpensive) Disks) groups (hereinafter referred to as RGs) 900A. An RG 900A is configured of multiple HDDs (Hard Disk Drives). Instead of HDDs, other physical storage devices such as flash memory may also be adopted. One or multiple logical volumes are based on one RG 900A. A logical volume is, for example, the above-mentioned DVOL or JVOL, both of which may be an actual logical volume which is a part of the storage space in the RG 900A or may also be a virtual logical volume to which actual areas are dynamically assigned (a virtual logical volume complying with thin provisioning technology) from a pool configured based on one or more RGs 900 (the storage area configured of multiple actual areas).

The DKC 111A comprises multiple front-end interface apparatuses (hereinafter referred to as FE-IFs) 610A, a back-end interface apparatus (hereinafter referred to as a BE-IF) 150A, a cache memory (hereinafter referred to as a CM) 620A, a shared memory (hereinafter referred to as an SM) 640A, and one or more CPUs (Central Processing Units) 630A coupled to the same. The processing of the DKC 111A may be performed by the CPU 630A executing one or more computer programs, and at least part of the processing may also be performed by a hardware circuit.

To the multiple FE-IFs 610A, the first host 103A and the second and the third storages 105B and 105C are connected. The DKC 111A (CPU 630A), via the FE-IFs 610A, communicates with the first host 103A and the second and the third storages 105B and 105C.

To the BE-IF 150A, the multiple RGs 900A are connected. The DKC 111A (CPU 630A), via the BE-IF 150A, writes the data (or JNLs) to the RG 900A which is the base of the write destination logical volume (e.g., the first DVOL 113A or the first JVOL 115A).

The CM 620A stores the data (and JNLs) written to the RGs 900A and the data (and JNLs) read from the RGs 900A.

The SM 640A stores various types of control information to be used for controlling the processing of the DKC 111A.

The CPU 630A controls the processing which the DKC 111A performs.

The configuration of the first storage 105A is as described above. Note that the DKC 111A may also comprise other types of configuration, not limited to the configuration shown in FIG. 7. Furthermore, the configuration of the second and the third storages 105B and 105C is practically the same as the configuration of the first storage 105A. However, the configuration of the DKC 111B or 111C may also be different from the configuration of the DKC 111A.

Figure 8:
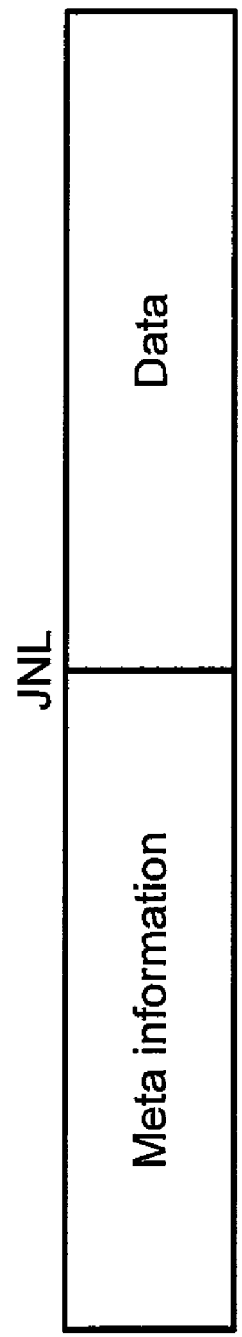
FIG. 8 shows the configuration of a JNL.
Figure 9:
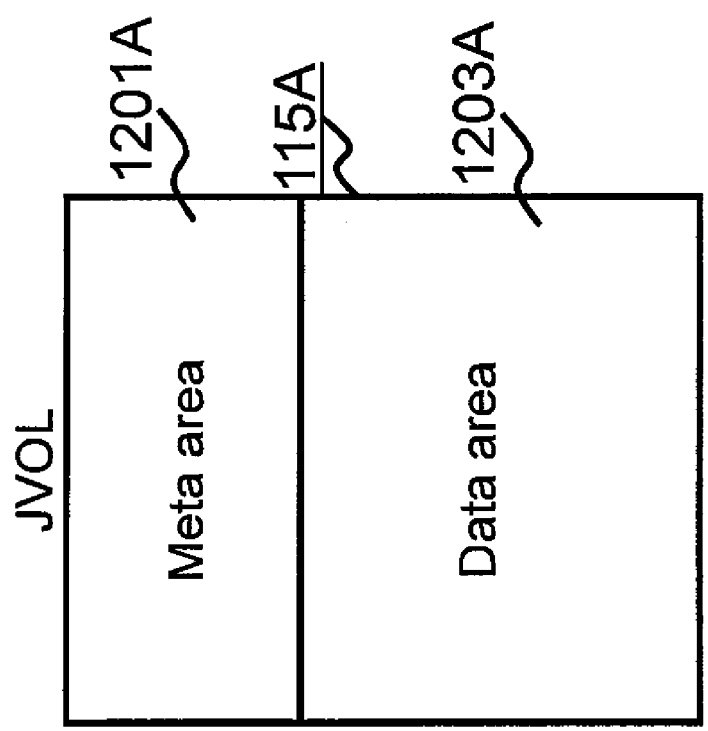
FIG. 9 shows the configuration of a JVOL 115A.

FIG. 8 shows the configuration of a JNL, and FIG. 9 shows the configuration of the JVOL 115A.

A JNL is configured of meta information and data.

The JVOL 115A is configured of a meta area 1201A and a data area 1203A. The meta area 1201A stores meta information, and the data area 1203A stores data. Note that the meta area 1201A may also exist in other storage resources than RGs 900A, such as in the CM 620A.

FIG. 10 shows the configuration of the meta information.

The meta information is the management information related to the data included in the JNL. The meta information, for example, includes the information below. SEQ#, Write destination information (information indicating where in the DVOL the data is written), PVOL# (copy source DVOL number), SVOL# (copy destination DVOL number), and The information indicating the location in the JVOL of the data corresponding to this meta information (this information is included when the JNL is written to the JVOL).

The first DKC 111A manages the SEQ#'s. The SEQ# exists in each JNL group 112A. The first DKC 111A, if writing the data to the DVOL 113A in a certain JNL group 112A, updates the SEQ# corresponding to the JNL group 112A. The SEQ#'s are, for example, stored in the SM 640A or on other storage resources.

Figure 11:
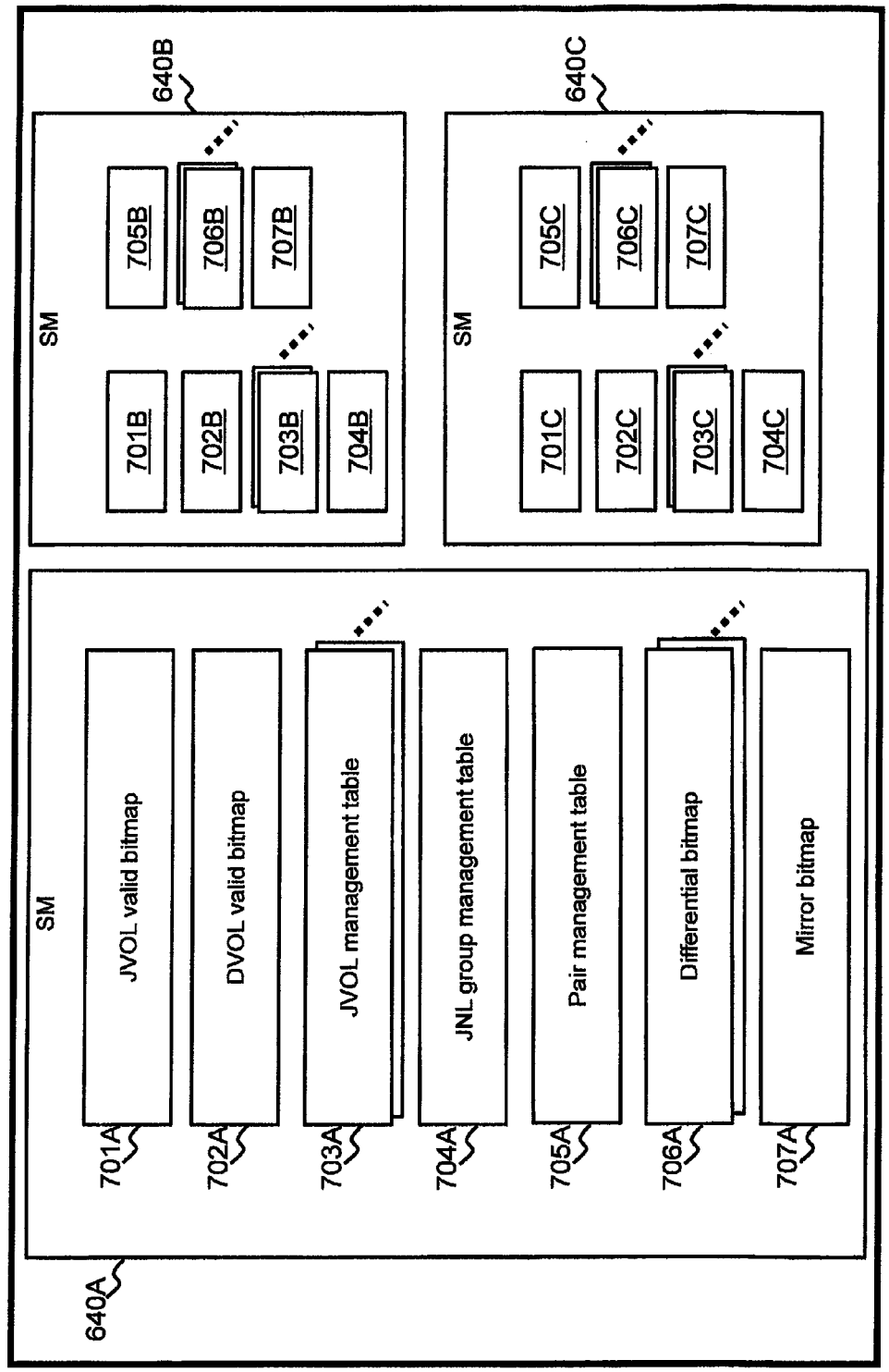
FIG. 11 shows the control information which each storage comprises.

As shown in FIG. 11, SM 640A, as control information, for example, stores a JVOL valid bitmap 701A, a DVOL valid bitmap 702A, a JVOL management table 703A, a JNL group management table 704A, a pair management table 705A, a differential bitmap 706A, and a mirror bitmap 707A. Similarly, the SM 640B in the second storage 105B stores the control information 701B to 707B, and the SM 640C in the third storage 105C stores the control information 701C to 707C. Hereinafter, the control information 701A to 707A is described as a representative.

Figure 12:
FIG. 12 shows the configuration of a JVOL valid bitmap 701A.

A JNL group, for example, can comprise a maximum of 64 logical volumes. The JVOL valid bitmap 701A, as shown in FIG. 12, comprises 64 bits per JNL group. If the n-th (n is an integer equal to or larger than 0 and equal to or smaller than 63) logical volume is the JVOL 115A, the n-th bit is on (e.g., 1).

The DVOL valid bitmap 702A, as shown in FIG. 13, comprises 64 bits per JNL group. If the n-th (n is an integer equal to or larger than 0 and equal to or smaller than 63) logical volume is the JVOL 115A, the n-th bit is on (e.g., 1).

The JVOL management table 703A exists in each JNL group 112A. The table 703A, as shown in FIG. 14, for each JVOL 115A, comprises the information indicating the beginning address of the meta area, the information indicating the size of the meta area, the information indicating the beginning address of the data area, and the information indicating the size of the data area. That is, the table 703A, for each JVOL 115A, indicates from where to where the meta area is and from where to where the data area is.

The JNL group management table 704A comprises the information related to the JNL groups. As more specifically described, for example, the table 704A, as shown in FIG. 15, for each JNL group, comprises the information below.
JNL group # 1001A indicating the JNL group number, Status 1002A indicating the status of the JNL group,
Mirror # 1003A indicating the number of the mirror existing in the remote copy system related to this embodiment, Corresponding JNL group # 1004A indicating the corresponding JNL group number,
Corresponding storage # 1005A indicating the number of the storage apparatus comprising the corresponding JNL group,
Purged SEQ# 1006A indicating the SEQ#'s which recently purged JNLs comprise,
Purgeable SEQ# 1007A indicating the SEQ#'s which JNLs that can be purged comprise, and Read SEQ# 1008A indicating the SEQ#'s which recently read JNLs comprise.

The pair management table 705A comprises the information related to the pairs of DVOLs. As more specifically described, for example, the table 705A, as shown in FIG. 16, for each DVOL 113A, comprises the information below.

DVOL # 1101A indicating the number of DVOL 113A,

JNL group # 1102A indicating the number of the JNL group 112A including the DVOL 113A, Copy destination volume # 1103A indicating the number of the copy destination DVOL of the DVOL 113A, and Status 1104A indicating the pair status of the DVOL 113A for the pair of the DVOL 113A and the copy destination DVOL.

There is the differential bitmap 706A for each DVOL 113A. The DVOL 113A is configured of multiple blocks. The differential bitmap 706A indicates which block of the DVOL 113A is updated. That is, the bits which the differential bitmap 706A comprises correspond to the blocks. The differential bitmap 706A is updated when the pair status of the DVOL 113A is a specified status. As more specifically described, for example, the DKC 111A, if the pair status of a certain DVOL 113A is a specified status and, at the same time, if the data is written to a certain block in the DVOL 113A, changes the bit corresponding to the block in the differential bitmap 706A corresponding to the DVOL 113A to on (e.g., 1).

The mirror bitmap 707A indicates what mirrors are valid and what mirrors are invalid. As more specifically described, the mirror bitmap 707A comprises multiple bits corresponding to multiple mirrors. For example, usually, the mirrors #0 and #2 are valid and the mirror #1 is invalid (refer to FIG. 5). In this case, the bits corresponding to the mirrors #0 and #2 are on (e.g., 1) and the bit corresponding to the mirror #1 is off (e.g., 0). Furthermore, if a failure occurs in the second storage 105B, the mirrors #0 and #2 are invalid and the mirror #1 is valid (refer to FIG. 6). In this case, the bits corresponding to the mirrors #0 and #2 are off, and the bit corresponding to the mirror #1 is on.

Hereinafter, several types of processing performed in this embodiment are described.

Write Processing and JNL Creation Processing

Figure 17:
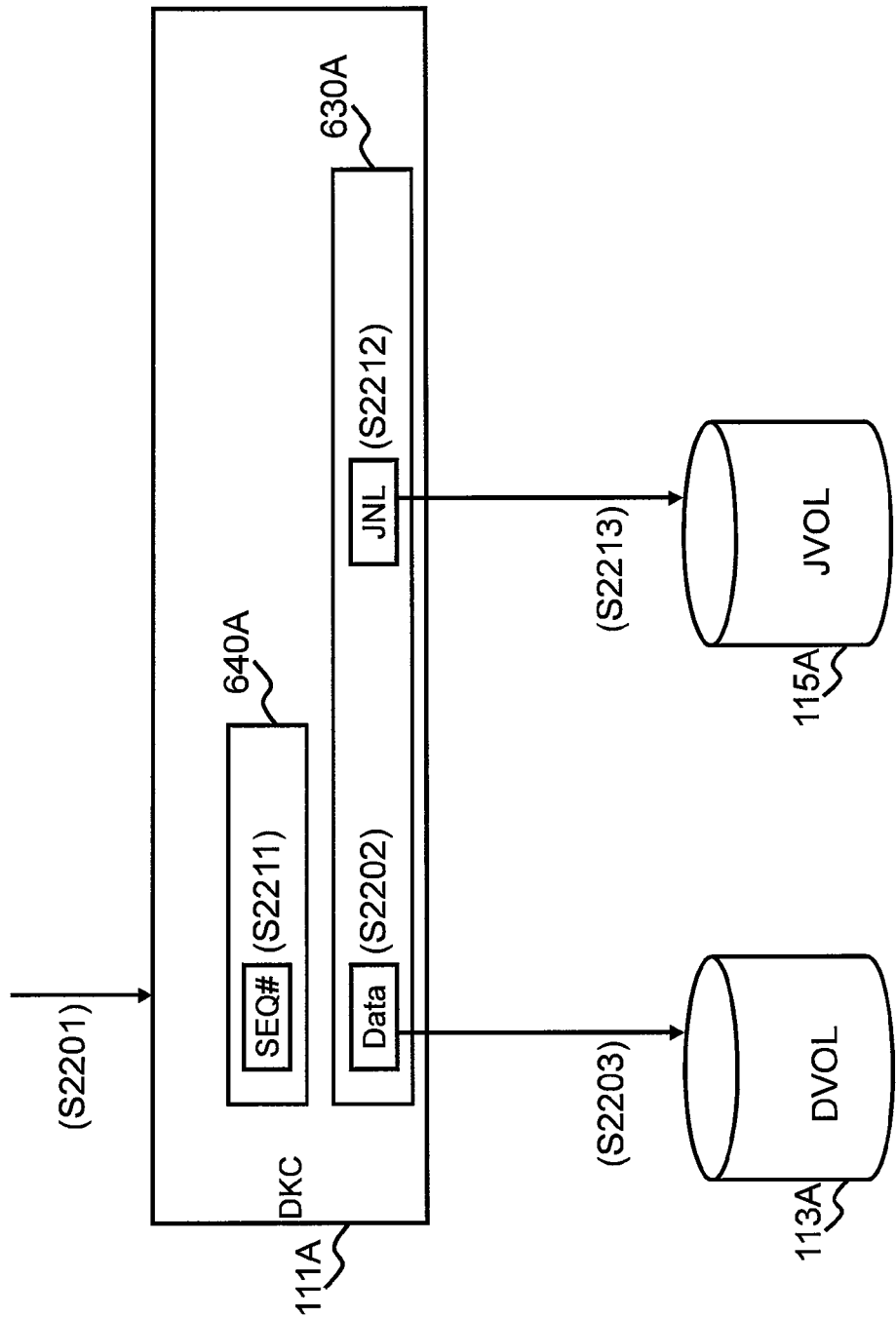
FIG. 17 shows the flow of the write processing in the first storage 105A.

As shown in FIG. 17, the first DKC 111A receives a write request specifying a PVOL 113A from the first host 103A (S2201), secures a CM area (cache memory area) in the CM 620A and, in the secured area, writes the data complying with the write request (write target data) (S2202). The first DKC 111A, at this point, may respond with the write completion to the first host 103A.

The first DKC 111A writes the write target data in the CM 620A to the PVOL 113A (S2203).

The first DKC 111A updates the SEQ# corresponding to the JNL group 112A including the PVOL 113A (S2211). The first DKC 111A creates a JNL (S2212), and writes the created JNL to the first JVOL 115A. The JNL created at 52212 comprises the meta information including the SEQ# updated at 52211 and the data written to the PVOL 113A at 52203. The data may be the data read from the PVOL 113A or may also be the data remaining in the CM 620A.

Asynchronous Remote Copy with Multihop Method and Control of Timing for Purging JNL As shown in FIG. 18A, the first DKC 111A, if data is written to the PVOL 113A (S4001), creates a JNL 10 comprising the data, and writes the created JNL 10 to the first JVOL 115A (S4002). The meta information in the JNL 10, as a SEQ#, comprises the order "100" in which the data which the JNL 10 comprises is written to the JNL group 112A. Furthermore, the meta information comprises the number "113A" indicating the PVOL 113A as a PVOL#, and comprises the number "113B" indicating the SPVOL 113B (the pair of the PVOL 113A) as an SVOL#. The first DKC 111A, with reference to the pair management table 705A, identifies that the PVOL# is "113A" and that the SVOL# is "113B," and creates a JNL including the meta information shown in FIG. 18.

As shown in FIG. 18B, the second DKC 111B reads the JNL 10 from the first JVOL 115A, and writes the JNL 10 to the second JVOL 115B (S4003). As more specifically described, for example, the second DKC 111B transmits a read request including a SEQ#: 100 and a number of the first JVOL 115A (or an LUN (Logical Unit Number) corresponding to the same) to the first storage 105A. The SEQ#: 100 is a value larger by 1 than the value indicated by the read SEQ# 1008B corresponding to the JNL group 112B and the mirror #0 (the information 1008B in the JNL group management table 704B). That is, the SEQ#: 100 is the SEQ# ascertained with reference to the read SEQ# 1008B. That is, the second DKC 111B is supposed to read the JNLs from the first storage 105A in ascending order of SEQ#'s.

As shown in FIG. 18B, the second DKC 111B identifies the SPVOL 113B from the SVOL# which the JNL 10 in the second JVOL 115B comprises, and writes the data which the JNL 10 comprises to the SPVOL 113B (S4004).

Next, as shown in FIG. 19A, the second DKC 111B updates the PVOL# and the SVOL# which the meta information in the JNL 10 comprises and, at least, does not update the SEQ# in the meta information (S4005). As more specifically described, the second DKC 111B, from the pair management table 705B, identifies the number of the SVOL 113C which is paired with the SPVOL 113B. Then, the second DKC 111B changes the PVOL# in the meta information which the JNL 10 comprises from "113A" to "113B" which is the number of the SPVOL 113B and, at the same time, changes the SVOL# in the meta information from "113B" to "113C" which is the number of the SVOL 113C. The SEQ# remains "100" and is not updated.

The second DKC 111B, after reflecting the JNL 10, updates the PVOL# and the SVOL# in the meta information which the JNL 10 comprises, and does not update the PVOL# and the SVOL# when the JNL 10 is not reflected.

Furthermore, the second DKC 111B, even if receiving a read request (JNL read request) specifying a SEQ#: 100 which the JNL 10 comprises from the third storage 105C before updating the PVOL# and the SVOL# in the meta information, does not transmit the JNL 10 to the third storage 105C (for example, the second DKC 111B returns a specified response (e.g., an error) to the read request).

As shown in FIG. 19B, after S4005, the JNL 10 may be copied from the second JVOL 115B to the third JVOL 115C (S4006). As more specifically described, the third DKC 111C transmits a read request including a SEQ#: 100 and a number of the second JVOL 115B (or an LUN corresponding to the same) to the second storage 105B. The SEQ#: 100 is a value larger by 1 than the value indicated by the read SEQ# 1008C corresponding to the JNL group 112C and the mirror #2 (the information 1008C in the JNL group management table 704C). That is, the SEQ#: 100 is the SEQ# ascertained with reference to the read SEQ# 1008C. That is, the third DKC 111C is supposed to read the JNLs from the second storage 105B in ascending order of SEQ#'s. The second DKC 111B, if receiving the read request and if S4005 is performed, reads the JNL 10 from the second JVOL 115B in response to the read request, and transmits the JNL 10 to the third storage 105C. The third DKC 111C receives the JNL 10 and writes the JNL 10 to the third JVOL 115C.

As shown in FIG. 19B, the third DKC 111C identifies the SVOL 113C from the SVOL# which the JNL 10 in the third JVOL 115C comprises, and writes the data which the JNL 10 comprises to the SVOL 113C (S4007).

The third storage 105C is the storage apparatus as the ending point. Therefore, at the point of S4007, the third DKC 111C changes the value indicated by the purgeable SEQ# 1007C corresponding to the JNL group 112C and the mirror #2 (the information 1008C in the JNL group management table 704C) to the value "100" indicated by the SEQ# in the JNL 10 reflected at S4007.

After that, as shown in FIG. 20A, the third DKC 111C purges the JNL 10 which comprises the value "100" as the SEQ# which the updated purgeable SEQ# 1007C indicates from the third JVOL 115C (S4008). Then, the third DKC 111C notifies the SEQ#: 100 in the purged JNL 10 to the second storage 105B which comprises the SPVOL 113B which is the copy source of the SVOL 113C (S4009).

The second DKC 111B receives the notification of the SEQ#: 100 from the third storage 105C. The second DKC 111B changes the value indicated by the purgeable SEQ# 1007B corresponding to the JNL group 112B and the mirror #0 (the information 1007B in the JNL group management table 704B) to the value "100" indicated by the notified SEQ#.

After that, as shown in FIG. 20B, the second DKC 111B purges the JNL 10 which comprises the value "100" as the SEQ# which the updated purgeable SEQ# 1007B indicates from the second JVOL 115B (S4010). Then, the second DKC 111B notifies the SEQ#: 100 in the purged JNL 10 to the first storage 105A which comprises the PVOL 113A which is the copy source of the SPVOL 113B (S4011).

The first DKC 111A receives the notification of the SEQ#: 100 from the second storage 105B. The first DKC 111A changes the value indicated by the purgeable SEQ# 1007A corresponding to the JNL group 112A and the mirror #0 (the information 1007A in the JNL group management table 704A) to the value "100" indicated by the notified SEQ#.

After that, as shown in FIG. 20C, the first DKC 111A purges the JNL 10 which comprises the value "100" as the SEQ# which the updated purgeable SEQ# 1007A indicates from the first JVOL 115A (S4012).

According to the description with reference to FIG. 20A to FIG. 20C, the JNL is sequentially purged from the storage apparatus as the ending point (third storage 105C) to the storage apparatus as the starting point (first storage 105A). Therefore, the JNL which the third storage 105C requires if a failure occurs in the second storage 105B remains in the first storage 105A. Therefore, even if a failure occurs in the second storage 105B, the operation can be continued.

Processing Performed in Second Initial Copy after Completion of First Initial Copy Before starting the asynchronous remote copy with a multihop method, the contents of the PVOL 113A, the contents of the SPVOL 113B, and the contents of the SVOL 113C must be consistent. The initial copy is performed between the storages 105A and 105B and between the storages 105B and 105C.

For example, it is assumed that both the status of the PVOL 113A-SPVOL 113B pair and the status of the SPVOL 113B-SVOL 113C pair are suspended. Therefore, the first DKC 111A manages the difference of the PVOL 113A from the SPVOL 113B, and the second DKC 111B manages the difference of the SPVOL 113B from the SVOL 113C.

Figure 21:
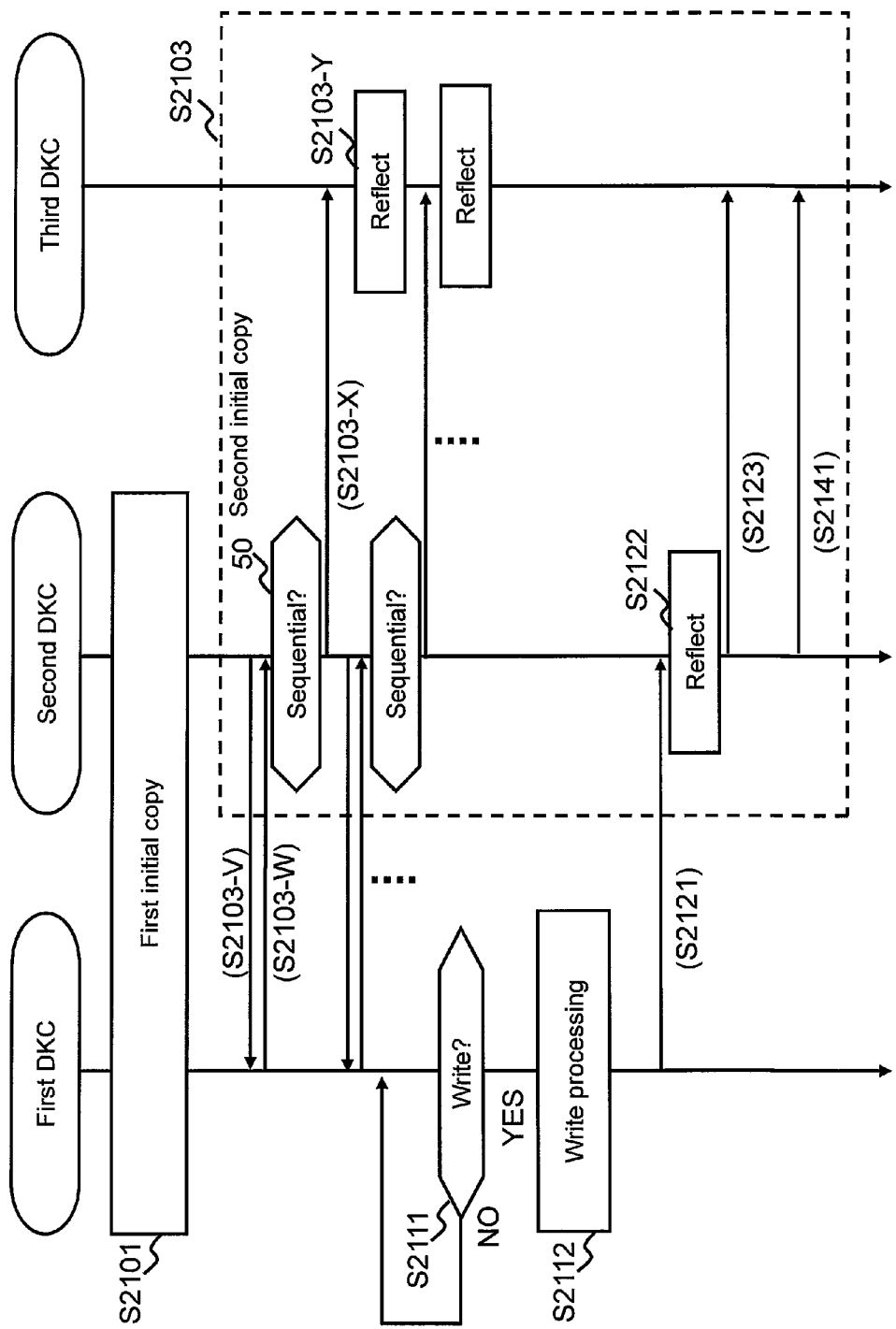
FIG. 21 shows the processing performed in the second initial copy after the completion of the first initial copy.
Figure 23:
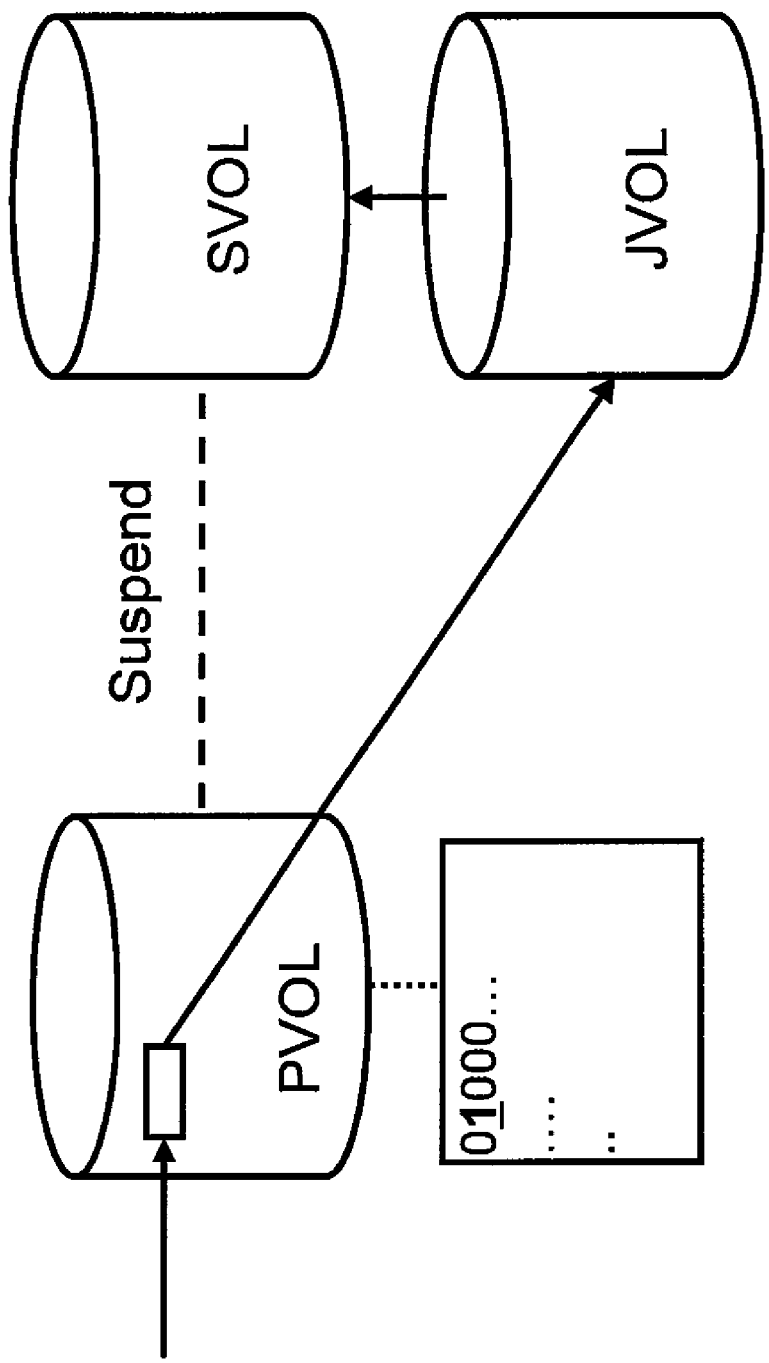
FIG. 23 shows the flow of the initial copy between storage apparatuses.
Figure 24:
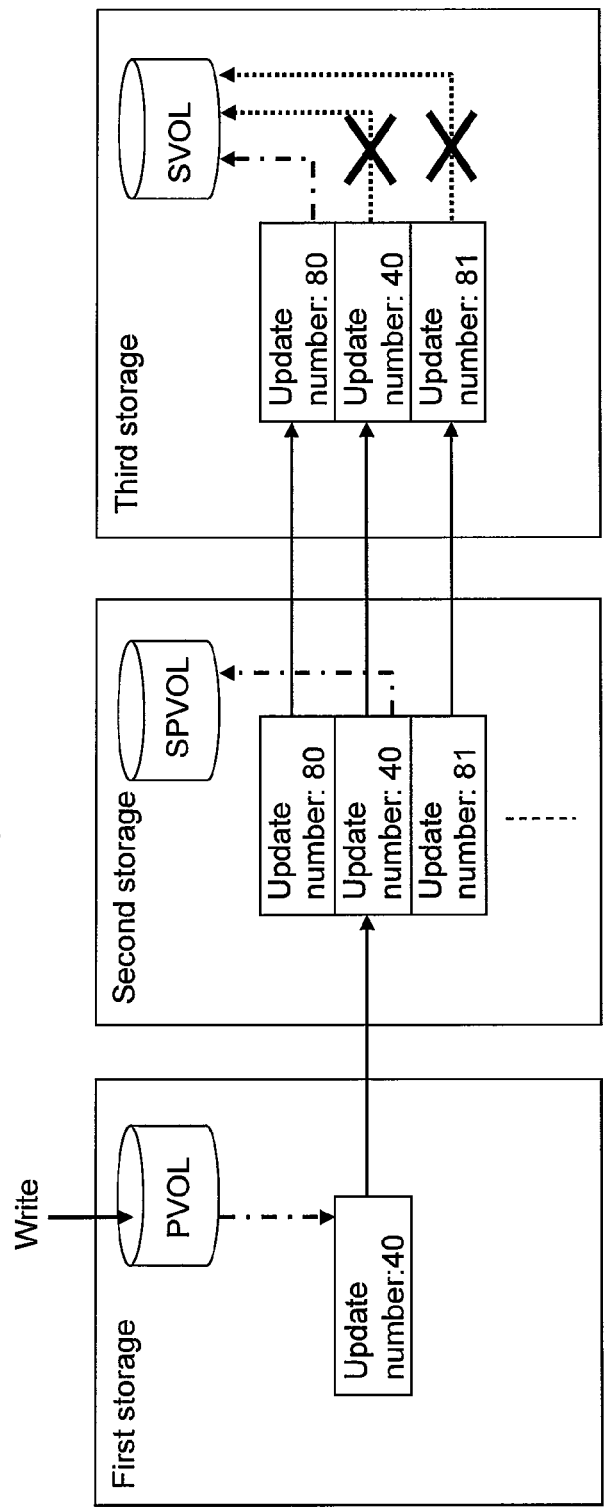
FIG. 24 shows an example of a problem which could occur in an asynchronous remote copy system with a multihop method.

At this point, as shown in FIG. 21, it is assumed that the first initial copy is performed between the storages 105A and 105B (S2101). The concrete processing performed in the initial copy is as described with reference to FIG. 23. That is, the first DKC 111A, for each differential block (updated block) in the PVOL 113A, updates the SEQ#, creates a JNL comprising the SEQ# and the data in the differential block and, without writing the created JNL to the first JVOL 115A, writes the same to the second JVOL 115B. The second DKC 111B reflects one or more JNLs in the second JVOL 115B which are not reflected (the JNLs written in the first initial copy) in the SPVOL 113B in ascending order of SEQ#'s. This makes the contents of the PVOL 113A and the contents of the SPVOL 113B completely consistent with each other. Note that the "differential block" in the PVOL 113A is the block storing the data which is different from the data in the block (the block in the SPVOL 113B (e.g., the block with the same address as the address of the differential block)) corresponding to the block. Furthermore, in the first initial copy, the second DKC 111B manages the block as the reflection destination of the JNL in the SPVOL 113B as the differential block.

After the first initial copy is completed, between the storages 105B and 105C, the second initial copy is performed (S2103). In the second initial copy, the JNL written to the second JVOL 115B in the first initial copy (the JNL comprising the data in the differential block in the PVOL 113A) is not transferred from the second JVOL 115B to the third JVOL 115C. That is, in the second storage 105B, a JNL is newly created for each differential block in the SPVOL 113B, and the created JNL is, without being written to the second JVOL 115B, written to the third JVOL 115C. The "differential block" in the SPVOL 113B is the block storing the data which is different from the data in the block (the block in the SVOL 113C (e.g., the block with the same address as the address of the differential block)) corresponding to the differential block.

As more specifically described, in the second initial copy (S2103), for each differential block in the SPVOL 113B, the processing described below is performed.

(*) The second DKC 111B transmits a dummy JNL request to the first storage 105A (S2103-V). The "dummy JNL" is the JNL which comprises meta information but does not comprise any data.

(*) The first DKC 111A receives the dummy JNL request, updates the SEQ# managed by the first DKC 111A in response to the request, and creates a dummy JNL including the updated SEQ#.

(*) The first DKC 111A transmits the created dummy JNL to the second storage 105B (S2103-W).

(*) The second DKC 111B receives the dummy JNL, writes the dummy JNL to the CM 620B, and performs a determination 50. The determination 50 is the determination whether the SEQ# which the received dummy JNL comprises is the SEQ# (hereinafter referred to as the "target SEQ#" in the description of FIG. 21 and FIG. 22) next to the SEQ# which the JNL recently transferred by the second DKC 111B to the third storage 105C comprises or not.

(*) The second DKC 111B, if the result of the determination 50 is positive, creates a JNL by including the data in the differential block in the above-mentioned received dummy JNL. This JNL is stored in the CM 620B and is not written to the second JVOL 115B. Note that, if the result of the determination 50 is negative, for example, S2121 which is described later (reading the new differential JNL) is performed. This is because the JNL comprising the target SEQ# exists in the first JVOL 115A.

(*) The second DKC 111B writes the created JNL to the third JVOL 115C (S2103-X). As more specifically described, the second DKC 111B transmits a write request specifying the third JVOL 115C (JNL write request) to the third storage 105B. The third DKC 111C receives the write request and, in response to the write request, writes the JNL to the third JVOL 115C.

(*) The third DKC 111C reflects the JNL written to the third JVOL 115C at S2103-X which is not reflected in the SVOL 113C (S2103-Y). At that point, the third DKC 111C may purge the JNL reflected at S2103-Y from the third JVOL 115C. Furthermore, the third DKC 111C may notify the SEQ# in the purged JNL to the second DKC 111B. The second DKC 111B may purge the JNL comprising the notified SEQ# from the CM 620B.

That is, according to this embodiment, the SEQ# in the JNL which the second DKC 111B creates during the second initial copy is the SEQ# which the first DKC 111A updates. Therefore, the first initial copy and the second initial copy are common in that SEQ# which the JNL transferred between the storage apparatuses comprises is the SEQ# which the first DKC 111A updates. Therefore, the sequentiality of the SEQ#'s is guaranteed.

This also applies to the cases where data is written from the first host 103A to the PVOL 113A during the second initial copy (the cases where the first DKC 111A receives a write request specifying the PVOL 113A from the first host 103A) (S2111: YES).

That is, in this case, as the PVOL 113A is in the write enable status, the first DKC 111A performs the write processing (refer to FIG. 17) in response to the write request (S2112). In the write processing, the first DKC 111A updates the SEQ# which the first DKC 111A manages by itself, creates a JNL comprising the data written to the PVOL 113A and the updated SEQ#, and writes the created JNL (hereinafter referred to as the new differential JNL) to the first JVOL 115A.

Due to the result of the determination 50 being negative, the second DKC 111B reads the new differential JNL from the first JVOL 115A, and writes the new differential JNL to the second JVOL 115B (S2121). As more specifically described, for example, the second DKC 111B transmits a read request specifying the SEQ# which the new differential JNL comprises and the first JVOL 115A to the first storage 105A. The first DKC 111A receives the read request. The first DKC 111A, in response to the read request, reads the new differential JNL including the same SEQ# as the SEQ# which the read request comprises from the first JVOL 115A. The first DKC 111A transmits the read new differential JNL to the second storage 105B. The second DKC 111B receives the new differential JNL, and writes the same to the CM 620B. The second DKC 111B may also write the new differential JNL to the second JVOL 115B.

The second DKC 111B reflects the new differential JNL (the new differential JNL including the target SEQ#) in the SPVOL 113B (S2122). Note that the new differential JNL is only permitted to be reflected in the SPVOL 113B at an arbitrary timing by the time the second initial copy is completed (e.g., before S2141 which is described later is performed).

The second DKC 111B writes the new differential JNL (the new differential JNL including the target SEQ#) to the third JVOL 115C (S2123).

The second DKC 111B, if no differential block remains in the SPVOL 113B, transmits a notification of there being no differential block to the third storage 105C (S2141). The third DKC 111C, receiving the notification, understands that no differential block exists in the SPVOL 113B.

The second initial copy is completed if all the JNLs written to the third JVOL 115C during the second initial copy are reflected in the SVOL 113B (that is, if no JNL that is not reflected exists in the third JVOL 115C). Therefore, the third DKC 111C may perform the reflection of the JNLs in the third JVOL 115C which are not reflected (reflecting the JNLs which are not reflected in ascending order of SEQ#'s) regularly instead of performing the same each time S2103-X is performed, or may also perform the same only when receiving the notification at 52141.

According to the description with reference to FIG. 21, the sequentiality of the SEQ#'s of the JNLs which are reflected in the third storage 105C is guaranteed. This is described with reference to the concrete example shown in FIG. 22.

Figure 22:
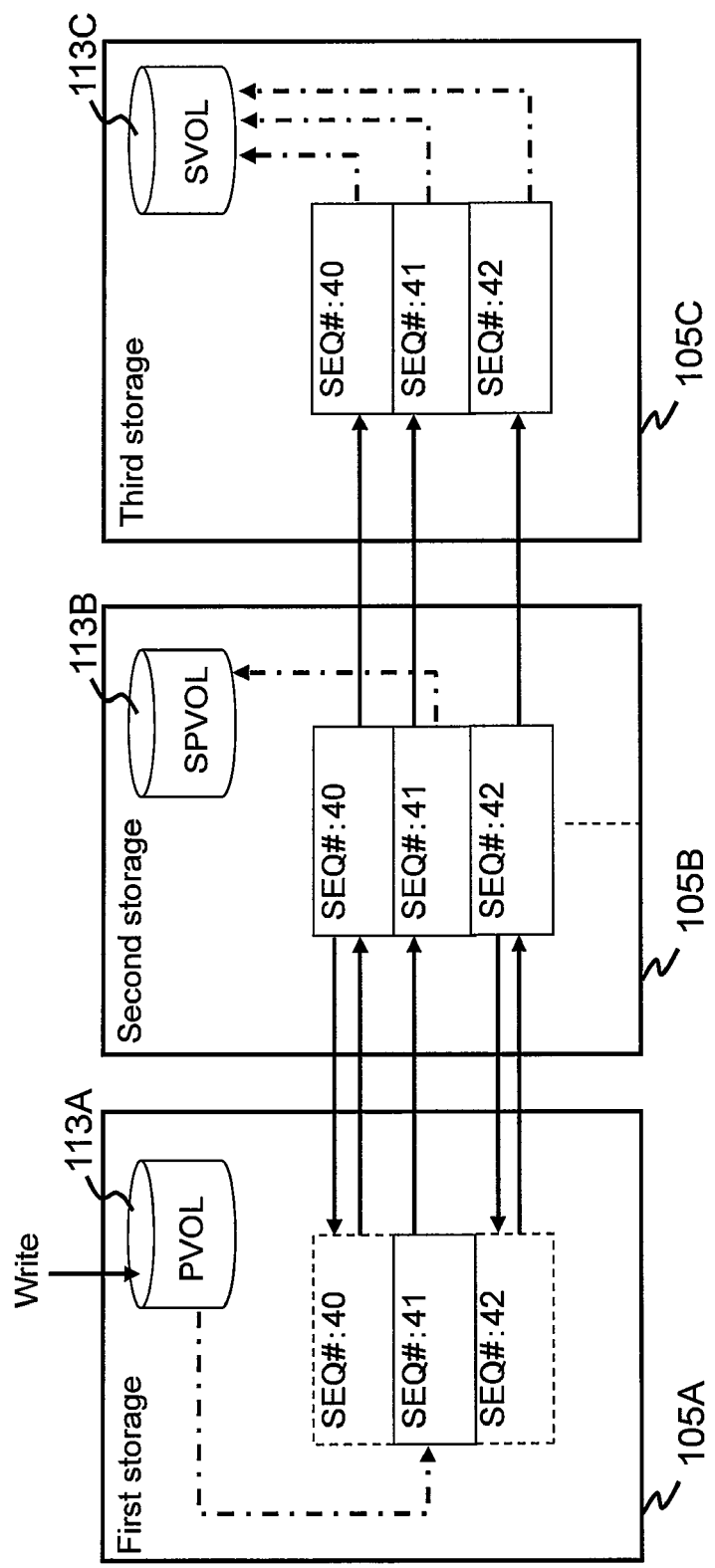
FIG. 22 shows the relationship between the SEQ# in the JNL transferred in the second initial copy and the SEQ# in the JNL comprising the data written to the PVOL 113A.

As shown in FIG. 22, for example, in the second initial copy, the second DKC 111B, for creating a JNL of the first differential block in the SVPVOL 113B, transmits a dummy JNL request to the first storage 105A. In response to the request, the first DKC 111A transmits a dummy JNL comprising the SEQ#: 40 to the second storage 105B. The second DKC 111B creates a JNL by including the data in the first differential block in the dummy JNL, and writes the JNL (the JNL including the SEQ#: 40) to the third JVOL 115C.

It is assumed that, before the dummy JNL request for the second differential block is transmitted, the data is written from the first host 103A to the PVOL 113A, and therefore that the SEQ# in the first storage 105A is updated from "40" to "41." In this case, the first DKC 111A creates a JNL including the SEQ#: 41, and writes the JNL to the first JVOL 115A.

The second DKC 111B transmits a dummy JNL request for the second differential block to the first storage 105A. In response to the request, the first DKC 111A updates the SEQ# from "41" to "42," and transmits a dummy JNL comprising the updated SEQ#: 42 to the second storage 105B. The second DKC 111B creates a JNL by including the data in the second differential block in the dummy JNL.

At this point, the second DKC 111B detects that the SEQ#: 42 which the created JNL comprises is not the target SEQ#: 41 (the SEQ#: 41 next to the SEQ#: 40 in the JNL recently written to the third JVOL 115C). That is, the second DKC 111B detects that the SEQ#'s are not sequential.

In that case, the second DKC 111B reads the JNL which comprises the target SEQ#: 41 from the first JVOL 115A, and writes the read JNL to the second JVOL 115B. The second DKC 111B reflects the JNL written to the second JVOL 115B (the JNL which comprises the target SEQ#: 41) in the SPVOL 113B and, at the same time, writes the same to the third JVOL 115C.

The second DKC 111B writes the JNL comprising the SEQ#: 42 (the JNL existing in the CM 620B) to the third JVOL 115B.

As a result, as shown in FIG. 22, the multiple SEQ#'s in the multiple JNLs written to the third JVOL 115C are sequential. Therefore, even if the PVOL 113A is in the write enable status while the second initial copy is performed, the JNLs can be normally reflected in the SVOL 113C in the third storage 105C.

Furthermore, according to the description with reference to FIG. 21, in the second initial copy, for transferring SEQ#'s from the first storage 105A to the second storage 105B, JNLs without any data referred to as dummy JNLs are utilized. Therefore, without performing any major design change, the SEQ# for the JNL created in the second initial copy can be notified from the first storage 105A to the second storage 105B.

Though an embodiment of this invention is described above, this invention is not limited to this embodiment and, as a matter of course, also comprises any changes or modifications within the spirit and scope hereof.

For example, though the above-mentioned description adopts the sequential numbers (SEQ#'s) as the update numbers, other types of numbers which increase or decrease regularly may also be adopted.

Furthermore, for example, all JNLs, though comprising updated SEQ#'s, may also comprise SEQ#'s before updates instead of the same.

Furthermore, for example, though a JNL transferred from the second storage 105B to the third storage 105C in the second initial copy is written to the CM 620C and written from the CM 620C to the third JVOL 115C, instead of the same, it may also be permitted that the JNL is written to the CM 620C but not written to the third JVOL 115C.

Furthermore, for example, in the second initial copy, the second DKC 111B may also transmit a dummy JNL request regardless of whether the processing of the dummy JNL transmitted in response to the recently transmitted dummy JNL request is completed or not.

Furthermore, for example, in the second initial copy, the second DKC 111B may also transmit a dummy JNL request after the JNL created based on the dummy JNL transmitted in response to the recently transmitted dummy JNL request is purged from the CM 620B.

Furthermore, for example, in the second initial copy, the second DKC 111B may also perform the determination 50 at the time of creating the JNL based on the dummy JNL.

Furthermore, for example, at least one of the storages 105A to 105C may also comprise multiple JNL groups.

Furthermore, for example, at least one of the storages 105A to 105C may also comprise logical volumes other than the logical volumes included in the JNL groups.

Furthermore, for example, the JNL transfer between the storage apparatuses may be the transfer by the copy destination storage apparatus reading JNLs from the JVOL in the copy source storage apparatus or may also be the transfer by the copy source storage apparatus writing the JNLs to the JVOL in the copy destination storage apparatus.

Furthermore, for example, there may also be two or more second storages 105B which are intermediate storages. In that case, the initial copy between the second storages 105B may be performed. That initial copy may be regarded practically as the second initial copy. In that initial copy, the second storage 105B as the copy destination, via the second storage 105B as the copy source, may acquire a SEQ# (a dummy journal including the SEQ) from the first storage 105A. Furthermore, purging can be performed as described below. For example, the third storage 105C may purge the JNL reflected from the third JVOL 115C from the third JVOL 115C and, at the same time, notify the SEQ# in the purged JNL to the second storage 105B coupled to the third storage 105C. Each of the second storages 105B may purge the JNL including the SEQ notified from one of the two storages (the third storage 105C or the second storage 105B on the side of the ending point) coupled to the second storage 105B from the JVOL 115B in the second storage 105B and, at the same time, notify the SEQ# in the purged JNL to the other one of the above-mentioned two storages (the second storage 105B on the side of the starting point or the first storage 105A). The first storage 105A may purge the JNL including the SEQ# notified from the second storage 105B coupled to the first storage 105A from the first JVOL 115A.

REFERENCE SIGN LIST

101A: first site, 101B: second site 101C: third site

The invention claimed is:

1. An asynchronous remote copy system which is a storage system which performs asynchronous remote copy, comprising three or more serial storage apparatuses, wherein the three or more storage apparatuses are a first storage apparatus which comprises a first storage resource group and is coupled to a host apparatus, one or more second storage apparatuses each of which comprises a second storage resource group, and a third storage apparatus which comprises a third storage resource group, the first storage resource group further comprises a first data volume which is a logical volume to which data is written, and a first journal storage resource which is a storage resource to which a data journal is written, the second storage resource group further comprises a second data volume which is a logical volume to which data is written, and a second journal storage resource which is a storage resource to which a data journal is written, the third storage resource group further comprises a third data volume which is a logical volume to which data is written, and a third journal storage resource which is a storage resource to which a data journal is written, the first storage apparatus is the starting point in the asynchronous remote copy in a multihop method, while the third storage apparatus is the ending point in the asynchronous remote copy in the multihop method, and the one or more second storage apparatuses are the intermediate storage apparatuses existing between the first and the third storage apparatuses, the first storage apparatus, if data is written from the host apparatus to the first data volume, updates the update number which is the number updated each time data is written to the data volume in the first storage resource group, creates a journal including the update number and the data, and writes the journal to the first journal storage resource, the asynchronous remote copy in the multihop method is performed, and in the asynchronous remote copy, by the journal being transferred from the first storage apparatus to the third storage apparatus via the one or more second storage apparatuses sequentially and, at the same time, being reflected in each transfer destination, the data in the first data volume is written to each of the second data volumes and the third data volume, before starting the asynchronous remote copy, (P) a first initial copy which is a copy for making the contents of the first data volume and the contents of the second data volume consistent, and (Q) one or more second initial copies each of which is a copy for making the contents of the second data volume and the contents of the third data volume or the contents of another second data volume consistent, are performed, and in the second initial copy, (q1) the second storage apparatus creates a journal including an update number and the data in the second data volume, (q2) the created journal is transferred from the second storage apparatus to the third storage apparatus or a transfer destination second storage apparatus, (q3) the third storage apparatus or the transfer destination second storage apparatus reflects the journals from the second storage apparatus in the third data volume or the second data volume in the transfer destination second storage apparatus in order of the update numbers, and wherein in the (q1), (q1-a) the second storage apparatus sends a dummy journal request requesting a dummy journal that is a journal without data to the first storage apparatus, (q1-b) the first storage apparatus receives the dummy journal request from the second storage apparatus and sends a dummy journal including an update number created at the first storage apparatus to the second storage apparatus, and (q1-c) the second storage apparatus receives the dummy journal and creates a journal by including the data in the second data volume into the dummy journal and without changing the update number created at the first storage apparatus.

2. The asynchronous remote copy system according to claim 1, wherein (R) if the first storage apparatus receives data from the first host apparatus in the (Q), (r1) the first storage apparatus writes the received data in the first data volume, (r2) the first storage apparatus updates the update number, and (r3) the first storage apparatus creates a journal including the update number and the data in (r1), and in the (g1), (q1-p) the second storage apparatus determines whether the update number received from the first storage apparatus is a target update number which is an update number next to the update number in the latest journal transferred to the third storage apparatus, and (q1-q) if the result in the determination in the (q1-p) is negative, the journal including the target update number is transferred from the first storage apparatus to the second storage apparatus, and is reflected in the second data volume, and is transferred from the second storage apparatus to the third storage apparatus or the transfer destination second storage apparatus.

3. The asynchronous remote copy system according to claim 1, wherein journals including the same update numbers are sequentially purged from the journal storage resource in the storage apparatus as the ending point to the journal storage resource in the storage apparatus as the starting point.

4. The asynchronous remote copy system according to claim 3, wherein the third storage apparatus purges the journal, reflected from the third journal storage resource, from the third journal storage resource, and, at the same time, notifies the update number in the purged journal to the second storage apparatuses, each of the second storage apparatuses purges the journal including the update number, notified from one of the two storage apparatuses coupled to the second storage apparatus, from the journal storage resource in the second storage apparatus, and, at the same time, notifies the update number in the purged journal to the other of the two storage apparatuses, and the first storage apparatus purges the journal including the update number notified from the second storage apparatus from the first journal storage resource.

5. A storage control method for an asynchronous remote copy system which is a storage system which performs asynchronous remote copy, wherein the asynchronous remote copy system comprises three or more serial storage apparatuses, the three or more storage apparatuses are a first storage apparatus which comprises a first storage resource group and is coupled to a host apparatus, one or more second storage apparatuses each of which comprises a second storage resource group, and a third storage apparatus which comprises a third storage resource group, the first storage resource group further comprises a first data volume which is a logical volume to which data is written, and a first journal storage resource which is a storage resource to which a data journal is written, the second storage resource group further comprises a second data volume which is a logical volume to which data is written, and a second journal storage resource which is a storage resource to which a data journal is written, the third storage resource group further comprises a third data volume which is a logical volume to which data is written, and a third journal storage resource which is a storage resource to which a data journal is written, the first storage apparatus is the starting point in the asynchronous remote copy in a multihop method, while the third storage apparatus is the ending point in the asynchronous remote copy in the multihop method, and the one or more second storage apparatuses are the intermediate storage apparatuses existing between the first and the third storage apparatuses, the first storage apparatus, if data is written from the host apparatus to the first data volume, updates the update number which is the number updated each time data is written to the data volume in the first storage resource group, creates a journal including the update number and the data, and writes the journal to the first journal storage resource, the asynchronous remote copy in the multihop method is performed, and in the asynchronous remote copy, by the journal being transferred from the first storage apparatus to the third storage apparatus via the one or more second storage apparatuses sequentially and, at the same time, being reflected in each transfer destination, the data in the first data volume is written to each of the second data volumes and the third data volume, before starting the asynchronous remote copy, (P) a first initial copy which is a copy for making the contents of the first data volume and the contents of the second data volume consistent, and (Q) one or more second initial copies each of which is a copy for making the contents of the second data volume and the contents of the third data volume or the contents of another second data volume consistent, are performed, and in the second initial copy, (q1) the second storage apparatus creates a journal including an update number and the data in the second data volume, (q2) the created journal is transferred from the second storage apparatus to the third storage apparatus or a transfer destination second storage apparatus, (q3) the third storage apparatus or the transfer destination second storage apparatus reflects the journals from the second storage apparatus in the third data volume or the second data volume in the transfer destination second storage apparatus in order of the update numbers, and the update number in the journal created in the (q1) is the update number updated in the first storage apparatus and acquired from the first storage apparatus, wherein in the (q1),
(q1-a) the second storage apparatus sends a dummy journal request requesting a dummy journal that is a journal without data to the first storage apparatus,
(q1-b) the first storage apparatus receives the dummy journal request from the second storage apparatus and sends a dummy journal including an update number created at the first storage apparatus to the second storage apparatus, and
(q1-c) the second storage apparatus receives the dummy journal and creates a journal by including the data in the second data volume into the dummy journal and without changing the update number created at the first storage apparatus.

\* \* \* \* \*